United States Patent [19]

Chao et al.

[11] Patent Number: 4,864,403
[45] Date of Patent: Sep. 5, 1989

[54] ADAPTIVE TELEVISION GHOST CANCELLATION SYSTEM INCLUDING FILTER CIRCUITRY WITH NON-INTEGER SAMPLE DELAY

[75] Inventors: Tzy-Hong Chao, Morrisville, Pa.; Edward R. Campbell, III, Tabernacle, N.J.; Henry G. Lewis, Jr., Stony Brook, N.Y.

[73] Assignee: RCA Licensing Corporation, Princeton, N.J.

[21] Appl. No.: 153,748

[22] Filed: Feb. 8, 1988

[51] Int. Cl.$^4$ .......................... H04N 5/21; H04N 5/14
[52] U.S. Cl. ...................................... 358/167; 358/36; 358/905
[58] Field of Search .................... 358/166, 167, 36, 37, 358/905

[56] References Cited

U.S. PATENT DOCUMENTS

| | | | |
|---|---|---|---|
| 4,127,874 | 11/1978 | Iwasawa et al. | 358/167 |
| 4,238,722 | 12/1980 | von Gierke et al. | 358/166 |
| 4,285,006 | 8/1981 | Kurahashi et al. | 358/166 X |
| 4,359,778 | 11/1982 | Lee | 358/167 X |
| 4,393,397 | 7/1983 | Holmes | 358/36 |
| 4,404,600 | 9/1983 | Murakani | 358/167 |
| 4,413,282 | 11/1983 | Wargo | 358/167 |
| 4,458,269 | 7/1984 | Schroeder | 358/167 |
| 4,542,408 | 9/1985 | Lewis, Jr. | 358/167 |
| 4,564,862 | 1/1986 | Cohen | 358/167 |
| 4,583,120 | 4/1986 | Murakami et al. | 358/167 |
| 4,694,414 | 9/1987 | Christopher | 364/724 |
| 4,698,680 | 10/1987 | Lewis, Jr. et al. | 358/167 X |
| 4,703,357 | 10/1987 | Ng et al. | 358/166 |
| 4,727,424 | 2/1988 | Chao | 358/167 |

FOREIGN PATENT DOCUMENTS 60-094580 5/1985 Japan .................................. 358/167
60-199275 10/1985 Japan .................................. 358/167

OTHER PUBLICATIONS

Ciciora, W. et al., "A Tutorial on Ghost Cancelling in Television Systems", IEEE Transactions on Consumer Electronics, Feb. 1979, pp. 9–44.
H. Thedick, "Adaptive Multipath Equalization for T.V. Broadcasting", IEEE Transactions on Consumer Electronics, May 1977, pp. 175–181.
Murakami, J. et al., "Ghost Clean System", IEEE Transactions on Consumer Electronics, Aug. 1983, pp. 129–133.
Goyal, S. et al., "Performance Evaluations of Selected Automatic Deghosting Systems for Television", IEEE Transactions on Consumer Electronics, Feb. 1980, pp. 100–120.

Primary Examiner—James J. Groody
Assistant Examiner—Mark R. Powell
Attorney, Agent, or Firm—Joseph S. Tripoli; Eric P. Herrmann

[57] ABSTRACT

A television signal ghost cancellation system is described in which a microprocessor is used to develop a mathematical model of the transmission channel which produced a ghosted video signal. The microprocessor determines the coefficient values and delay values for a digital IIR filter from this model. The system uses the IIR filter to cancel ghost signals from the ghosted video signal. The IIR filter includes circuitry for interpolating between successively delayed sample values to cancel ghost signals which are delayed by a non-integer number of sample periods.

10 Claims, 8 Drawing Sheets

| 1 − F | F | C | DELAY CHANGE | TOTAL DELAY |
|---|---|---|---|---|
| 1 | 0 | 0 | 0 | Ts |
| 7/8 | 1/8 | 1/32 | Ts/8 | 9Ts/8 |
| 6/8 | 2/8 | 2/32 | Ts/4 | 10Ts/8 |
| 5/8 | 3/8 | 3/32 | 3Ts/8 | 11Ts/8 |
| 4/8 | 4/8 | 3/32 | Ts/2 | 12Ts/8 |
| 3/8 | 5/8 | 3/32 | 5Ts/8 | 13Ts/8 |
| 2/8 | 6/8 | 2/32 | 3Ts/4 | 14Ts/8 |
| 1/8 | 7/8 | 1/32 | 7Ts/8 | 15Ts/8 |
| 0 | 1 | 0 | Ts | 2Ts |

ADAPTIVE TELEVISION GHOST CANCELLATION SYSTEM INCLUDING FILTER CIRCUITRY WITH NON-INTEGER SAMPLE DELAY

This invention relates to a television ghost signal cancellation system which first develops a channel model that, in response to a ghost-free input signal, would produce the ghosted signal Then, based on this model, the system develops a ghost cancellation filter to substantially remove the ghost signal components from the ghosted signal.

Television reception has long been plagued by multi-path distortion, the reception of undesired multiple signals. These undesired signals, reflected from buildings and other large objects or resulting from poorly terminated cable networks, appear as delayed versions of the direct television signal, and are commonly referred to as ghost signals in the reproduced image.

The ghost signals are delayed from the direct signal as a function of the relationship of the signal path lengths between the direct and the ghost signals. The randomness of this relationship from one receiver location to another dictates that the phase of the ghost carrier signal may have any relationship to the phase of the direct signal. In order to fully remove the ghost signal from the direct signal, it is necessary to consider the amplitude of the ghost signal, its delay and its carrier phase relative to that of the direct television signal.

To understand the importance of the relative phase of a ghost signal, it is helpful to know more about the television signal itself. Under the NTSC standard, television signals are transmitted in vestigal sideband form. The relatively low frequency components of the baseband signal (from 0–1.25 MHz) are double sideband modulated (DSM) while the higher frequency components (from 1.25 to 4.75 MHz) are single sideband modulated (SSM). The quadrature components of the two sidebands of the DSM portion of the signal are mutually cancelling, so the quadrature component of the DSM video signals is substantially zero. The quadrature components of the SSM portion of the signal, however, are non-zero and may interfere, as a ghost signal, with the in-phase portion of the modulated video signal.

Analytically, the in-phase and quadrature components of the modulated video signal, v(t), may be represented by a complex baseband equivalent defined by the equation (1):

$$v(t) = v_I(t) + jv_Q(t) \qquad (1)$$

where j is the complex quantity corresponding to the square root of $-1$ and $v_I(t)$ and $v_Q(t)$ are the baseband signals which would be obtained if the signal v(t) were synchronously demodulated from, for example, an intermediate frequency (IF) signal, using oscillatory signals that are respectively in-phase with and quadrature phase related to the picture carrier signal. When the signal v(t) is applied to a multipath transmission channel a ghost distorted signal is produced.

FIG. 1 illustrates the importance of the relative phases of the direct and ghost signals. When, for example, the direct signal is a 2T pulse, represented by waveform 10, the ghost signal may be represented by the waveforms 10, 12, 14 or 16 if the relative phase angle between the direct carrier signal and the ghost carrier signal is 0°, 90°, 180° or $-90°$ (270°) respectively. Furthermore, since the relationship between the direct and ghost signal paths is random, any intermediate waveform is also a possibility.

The relative amplitude and phase information of the direct and ghost signals can be determined by demodulating the television signal into in-phase (I) and quadrature (Q) components. The I component being in-phase with the picture carrier of the television signal and the Q component being in-phase with a signal that is phase shifted by 90° relative to the picture carrier. These components describe the television signal in the complex plane where the I and Q components correspond to coordinates along the real and imaginary axes respectively. The convention of referring to the in-phase and quadrature components of the video signals as real and imaginary components respectively is used throughout this application.

As set forth in a paper entitled "Adaptive Multipath Equalization for T.V. Broadcasting", IEEE Transactions on Consumer Electronics, May 1977, pp. 175–181, by H. Thedick, and hereby incorporated by reference, the transmission path which produces a ghost signal may be modeled as a feed-forward system in which the direct signal is reduced in amplitude by an attenuation factor, a, and delayed by an interval of time, $\tau$, to form a ghost signal. The video signal which includes multipath ghost signals may be represented by the equation (2)

$$r(t) = \sum_{i=1}^{K} a_i v(t - \tau_i) + n(t) \qquad (2)$$

where $a_i$, is the complex coefficient, and $\tau_i$ is the relative time delay of the ith signal path. The term n(t) in this equation is the received noise. Including the direct path, there are a total of K paths (i.e. K-1 ghost signals). The magnitude and phase of the complex coefficient $a_i$ are the relative attenuation factor and the carrier phase of the ith path, respectively. Let i=1 be the direct path. Ideally, when there is no multi-path problem, $a_1 = 1$, $\tau_1 = 0$, and $a_i = 0$ for $i = 2, \ldots K$.

The ghosted signal represented by the equation (2) is merely a weighted sum of various delayed-versions of the original signal plus noise. In a receiver with no deghosting mechanism, either the real part or the magnitude of r(t) is decoded. This can then yield overlayed images or ghosts on a TV display.

Ghost cancellation systems have been proposed which operate on the in-phase and quadrature components of a video signal. An example of such a system may be found in U.S. Pat. No. 4,703,357 entitled "Adaptive Television Deghosting System", which is hereby incorporated by reference. The system described in that patent uses a digital IIR filter having complex filter coefficients to adaptively remove ghost signals from a received video signal. The IIR filter is conditioned by a control signal first to act as a correlator to determine the time delay of the ghost signals, relative to the direct signal, and then to act as a ghost cancellation filter. Delay values determined by the correlator are preset into variable delay elements which form the taps of the IIR filter, and the tap coefficients are set to predetermined values. The ghost cancellation system then monitors the filtered video signal during a training interval and changes the coefficient values in a sense to minimize ghost signals at the output of the filter in a training interval.

The system described in the above-referenced patent is a digital system which includes an analog-to-digital converter (ADC) that samples the ghosted video signal at a fixed sampling frequency. Consequently, the signals processed by the ghost cancellation filter are valid only at the discrete sampling points. This may present a problem when a ghost signal is delayed with respect to the main signal by an amount of time which is not an integral multiple of the sampling interval. In this instance, the ghost signal which is canceled by the filter may not be the same as the one that contaminates the received video signal and, consequently, a significant artifact of the ghost signal may remain in the processed video signal.

It would be advantageous if a digital ghost cancellation system could be provided which used a simpler IIR filter and which was capable of correcting ghost signals having time delays that are not integral multiples of the sampling interval.

SUMMARY OF THE INVENTION

The present invention is embodied in a ghost cancellation system which includes a control processor that analyzes a received ghosted video signal during a training interval and formulates a channel model describing the transmission channel which produced the ghosted video signal. The control processor then converts this channel model into a set of coefficient values for a complex IIR filter. In one embodiment of the invention, the set of coefficient values produced by the data processor conditions the IIR filter to interpolate delayed samples from among a plurality of time sequential samples to effectively cancel a ghost signal having a relative time delay which is not an integral multiple of the sampling interval. In a second embodiment of the invention, the filter includes sample value interpolation circuitry coupled to at least one tap of the IIR filter to effectively cancel a ghost signal having a relative time delay which is not an integral multiple of the sampling interval.

As set forth in the above referenced paper by H. Thedick, the transmission channel which adds multipath distortion to a television signal may be modeled as a finite impulse response (FIR) filter. As further stated in the Thedick article, the ghost signals introduced by this transmission channel may be effectively canceled by an infinite impulse response (IIR) filter having a transfer function which is the inverse of the transfer function of the transmission channel.

In the embodiments of the invention described below, a complex IIR filter having adjustable delay values and adjustable coefficient values is used as a ghost cancellation filter. The values for the time delays and coefficient values are determined by a microprocessor from a training signal which is transmitted with the NTSC television signal. These values are determined by analyzing the ghost-contaminated signal prior to any ghost cancellation operations. The delay values and coefficients are then applied to the IIR filter to condition it to cancel ghost signals from the received video signals.

Figure 2:
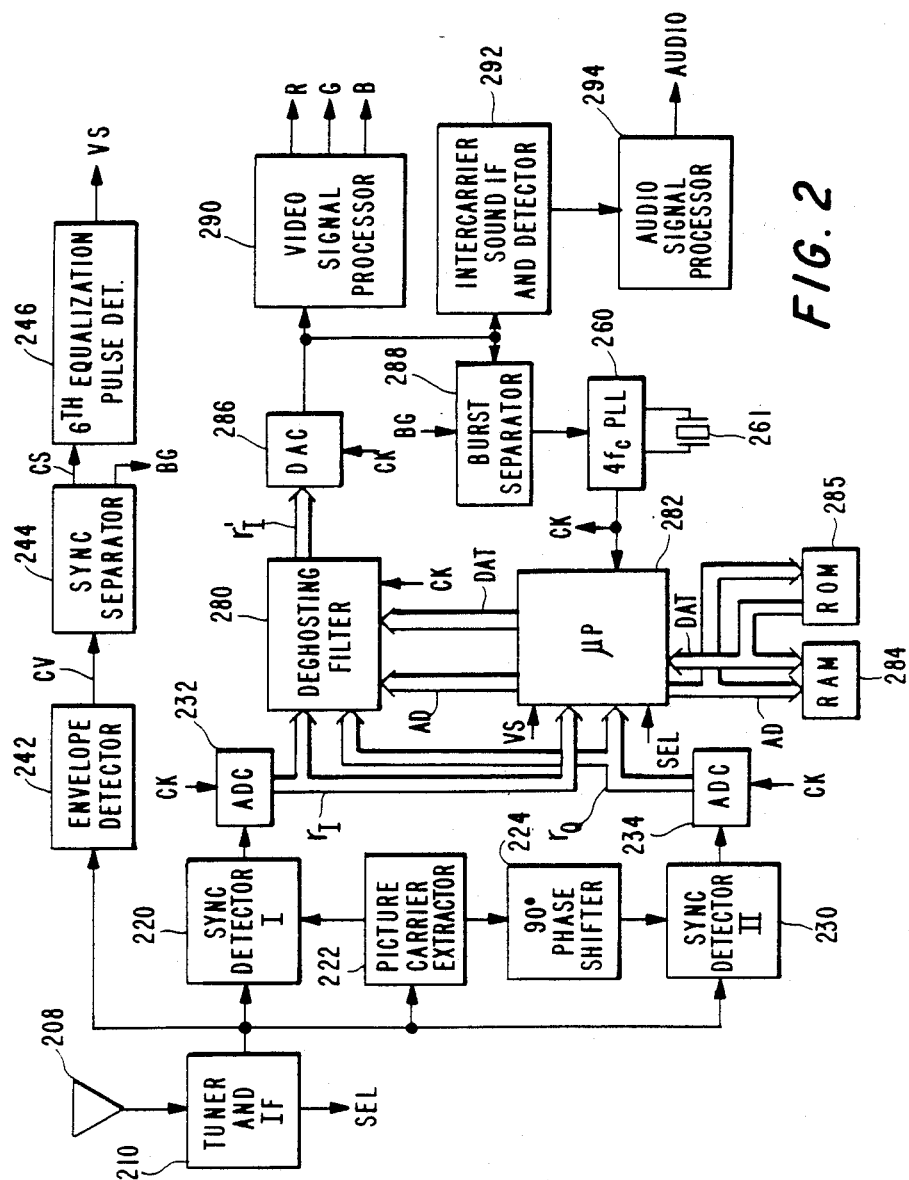
FIG. 2 is a block diagram of the signal processing portion of a television receiver which includes an embodiment of the present invention.

The following is a brief description of the ghost cancellation system shown in FIG. 2. This is followed, in turn, by a more detailed description of the method by which the delay and coefficient values for the ghost cancellation filter are determined and then by a more detailed description of the ghost cancellation filter itself.

In the drawings, broad arrows represent busses conveying multiple-bit parallel digital signals and line arrows represent connections conveying analog signals or single-bit digital signals. Depending on the processing speed of the devices, compensating delays may be required in certain of the signal paths. One skilled in the art of digital signal processing circuit design will know where such delays are needed in a particular system.

Referring to FIG. 2, the signal processing section of a television receiver is shown. Radio frequency (RF) signals are received by an antenna 208 and applied to tuner and IF circuitry 210 The circuitry 210 may, for example, include a conventional television tuner and intermediate frequency (IF) filter and amplifier. In the present embodiment, the pass-band of the IF filter desirably encompasses the modulated sound signals.

The IF signals developed by the circuitry 210 are applied to a conventional envelope detector 242 which develops a baseband composite video signal CV. Conventional sync separator circuitry 244 is responsive to the signal CV to remove the composite synchronization signal, CS, from the composite video signal. The sync separator circuitry 244 also produces a burst gate signal, BG, which may be used to extract the color synchronizing burst signal components from each horizontal line of video signal.

A detector 246, responsive to the composite synchronization signal, CS, detects the last (sixth) pre-equalization pulse preceding the vertical synchronization pulse interval. The circuitry 246 produces an output pulse signal, VS, which substantially coincides with the sixth pre-equalization pulse of each field of the composite video signal. As set forth below, this pulse may be used to locate a training signal which is used to determine the relative delay, the relative amplitude and the relative phase of the ghost signals with respect to the direct signal.

The signals developed by the tuner and IF circuitry 210 are applied to a first synchronous detector 220, a picture carrier extractor circuit 222 and a second synchronous detector 230. The picture carrier extractor circuit 222 produces a first reference signal aligned in phase and frequency with the picture carrier of the direct video IF signal. This first reference signal is applied to the first synchronous detector 220 and to a 90° phase shifter circuit 224. The phase shifter circuit 224 develops a second reference signal, quadrature phase related to the first reference signal. This second reference signal is applied to the second synchronous detector 230. The synchronous detectors 220 and 230 demodulate the IF signals into respective in-phase and quadrature phase components. The in-phase signals are applied to an analog-to-digital converter (ADC) 232 which is responsive to a system clock signal CK for developing digital signals $r_I$. Similarly, the quadrature phase signals are applied to an ADC 234 which, responsive to the clock signal CK, develops digital signals $r_Q$. The clock signal CK, which may, for example, have a frequency, $4f_c$, substantially equal to four times the NTSC color subcarrier frequency, $f_c$, is developed by the phase-locked loop (PLL) 260 described below.

The signals $r_I$ and $r_Q$ are applied to a deghosting filter 280 and to a microprocessor 282. As set forth below, the deghosting filter 280 includes a complex sampled data IIR filter. The filter 280, under control of the microprocessor 282, filters the ghost-contaminated signals $r_I$ and $r_Q$ to produce a signal $r_I'$ which approximates the in-phase component of the direct signal to the substantial exclusion of any ghost signals. The signal $r_I'$ is applied to a digital-to-analog converter (DAC) 286, which produces an analog baseband composite video signal, representing the digital signal $r_I'$.

The analog baseband composite video signal is applied to a conventional burst separator 288 which is responsive to the burst gate signal, BG, provided by the sync separator circuitry 244 for separating the color synchronizing burst components from each horizontal line of the composite video signal. The separated burst signals are applied to the conventional PLL 260 which includes a resonant crystal 261 having, for example, a resonant frequency of approximately $4f_c$. The PLL 260 is controlled by the burst signals to produce the $4f_c$ clock signal, CK.

Composite video signals from the DAC 286 are also applied to a conventional video signal processor 290 and to intercarrier sound IF amplifier and detector circuitry 292. The video signal processor 290 may includes, for example, circuitry to separate the luminance and chrominance signal components from the composite video signal and to process these components to produce red, green and blue primary color signals (R, G, and B respectively) for application to a display device (not shown). The intercarrier sound circuitry 292 may include a resonant tuned circuit for separating the 4.5 MHz sound carrier from the composite video signal, a 4.5 MHz IF amplifier and an FM demodulator for developing an audio signal. The audio signal is applied to an audio signal processor 294 which produces an audio signal for application to a speaker (not shown).

The microprocessor 282 may be any one of a number of the currently available microprocessors which include a direct memory access (DMA) instruction, standard arithmetic instructions and interrupt handling capabilities. The microprocessor 282 is coupled to a random access memory (RAM) 284 and a read only memory (ROM) 285. It is further coupled to receive a signal SEL from tuner and IF circuitry 210, indicating the currently selected channel; to receive the signal VS provided by the sixth equalization pulse detector 246 and to receive the clock signal CK. The microprocessor 282 is coupled to provide various signals to the deghosting filter 280 via the busses AD and DATA as described below.

The deghosting operation begins when the signal SEL indicates that a signal from a new channel has been selected. At this time, the microprocessor 282, responsive to the pulse signal VS, executes a DMA instruction to store 768 of the $r_I$ and $r_Q$ samples, occurring during the interval following the sixth equalization pulse, into the RAM 284. These 768 samples constitute approximately eighty-five percent of one horizontal line period of the incoming signal. This interval includes at least a few samples preceding the leading edge of the vertical sync pulse, samples representing the leading edge of the vertical sync pulse and samples representing the portion of the vertical sync pulse preceding the first serration. This signal is used as a training signal by the microprocessor 282 to determine the delay values and coefficient values which are to be applied to the deghosting filter 280.

Figure 3:
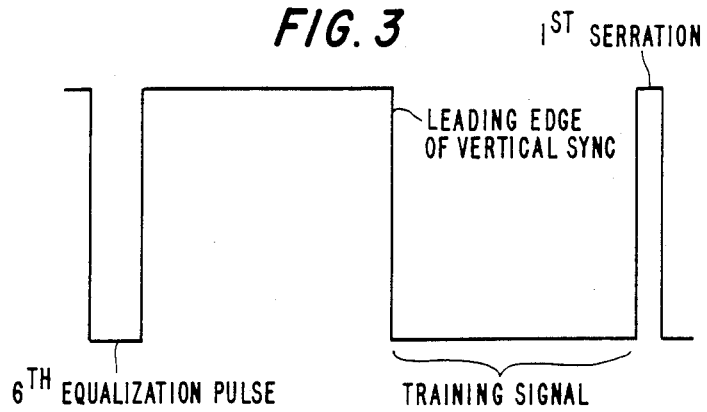
FIGS. 3 and 4 are waveform diagrams of amplitude versus time showing signals that are useful in explaining the operation of the circuitry shown in FIG. 2.

The waveform of the in-phase part of this training signal is shown in FIG. 3. The portion of the signal between the sixth equalization pulse and the leading edge of vertical sync has a duration of 0.46 times the horizontal line period (0.46H) and a nominal amplitude of 0 IRE units. The portion of the signal between the leading edge of vertical sync and the first serration in the vertical sync pulse has a duration of 0.43H and a nominal amplitude of $-40$ IRE units. It is assumed that, in the absence of noise, any deviation from the amplitude value of $-40$ IRE units during this part of the signal is the result of a ghost signal that is a delayed, attenuated and possibly phase-shifted version of the leading edge of vertical sync.

This signal is constrained by regulations of the Federal Communications Commission (FCC) to have substantially fixed timing and amplitude characteristics. Since this signal is held to close tolerances by the FCC regulations, a model of the signal may be stored the ROM 285 during the manufacture of the receiver and then used by the microprocessor 282 to compare against the received signal and, so, determine the timing amplitude and phase of ghost signals relative to the direct signal. This model includes both the in-phase and quadrature components of the video signal.

Figure 4:
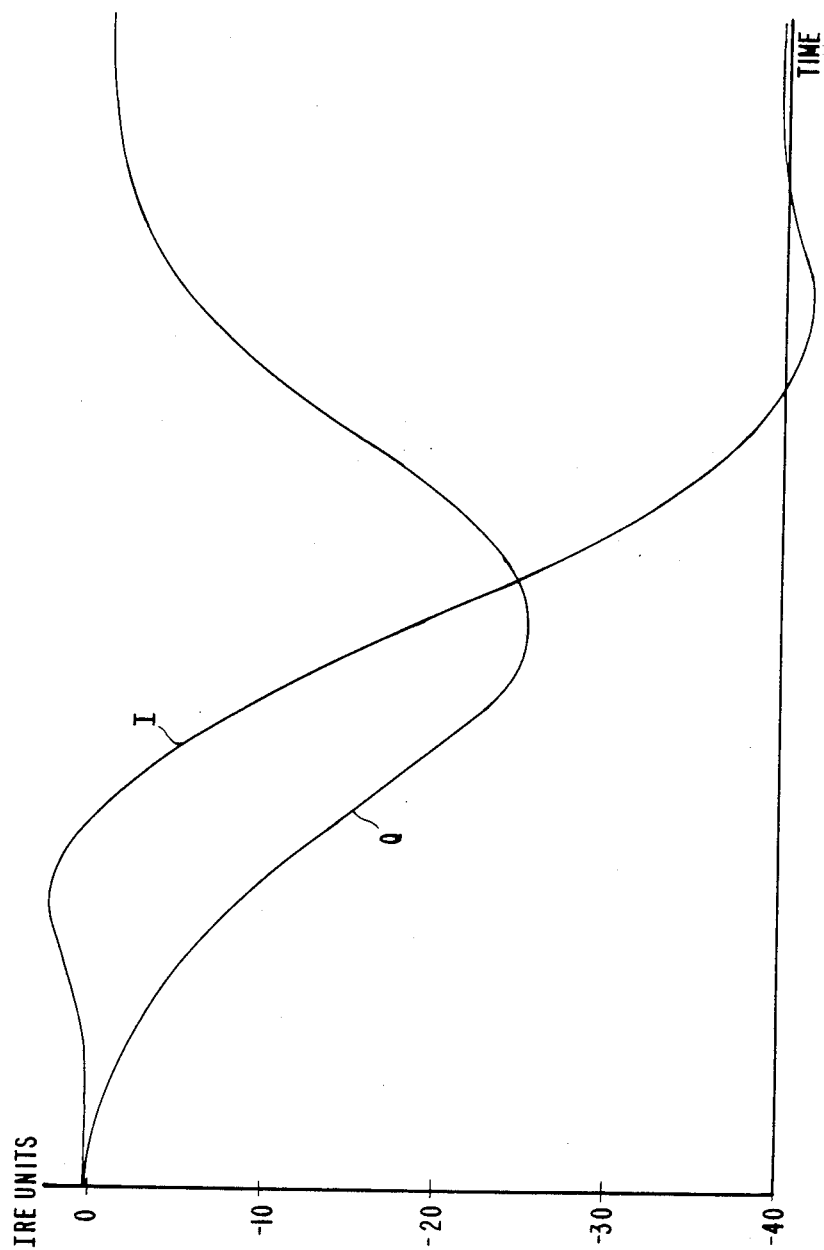

As set forth below, the sampled values of the training signal stored in the ROM 285 may have a much higher effective sampling rate than the received video signal. FIG. 4 is a waveform diagram showing the in-phase, I, and quadrature phase, Q, components of the leading edge of vertical sync. 144 samples describing each of the waveforms shown in FIG. 4 are held in the ROM 285. This yields an effective sampling rate of 64 $f_c$. Since the training signal is essentially flat in the region following the leading edge of vertical sync, the remaining samples of the training signal, i.e. those describing the interval between the leading edge of vertical sync and the first serration, may be generated by replicating the last samples of the two waveforms.

As described above, in this embodiment of the invention the microprocessor 282 processes samples taken during the training interval to develop a model transfer function which approximates the transfer function of the transmission channel. Using delay values and coefficient values taken from this model transfer function, the microprocessor 282 programs the IIR deghosting filter 280 to cancel the ghost signals from the received video signals.

In the explanation of the algorithm used to develop the channel model, presented below, extensive use is made of vector notation. In general, a signal is represented by a lower case letter, for example, s(t), a vector containing multiple sample values of a signal is represented by an underlined lower case letter, for example, s, and a matrix of sample values is represented by an upper case letter, for example, S.

The algorithms described below have been implemented in the FORTRAN 77 programming language for execution on a VAX computer manufactured by the Digital Equipment Corporation. A copy of these programs is included as an appendix to the application. These programs include a reference to a subroutine CSVDS which is not included in the appendix. This subroutine performs a singular value decomposition of a matrix which has complex elements. It is available to the general public through the LINPACK library package and is described at pp C122-C129 of the LINPACK users guide by J. J. Dongara which is published by Society for Industrial and Applied Mathematics (SIAM).

These programs also contain a list of the values to be loaded into the ROM 285 representing the in-phase and quadrature components of the leading edge of vertical sync as described above in reference to FIG. 4. These values are used to generate the reference signal matrix and reference signal vectors referenced below. In this embodiment of the invention, object code obtained by compiling programs such as those included in the appendix is stored in the ROM 285 along with the data describing the leading edge of vertical sync.

The first step in the algorithm which develops the transfer function is to obtain samples representing the received training signal. As set forth above, the microprocessor 282 is responsive to the signal VS, generated by the sixth equalization pulse detector 246, to load 768 samples of each of the signals $r_I(t)$ and $r_Q(t)$, provided by the respective ADC's 232 and 234. The complex vector containing the samples of the signals $r_I(t)$ and $r_Q(t)$ is r. The complex vector containing the samples of the reference training signal, which is obtained by taking every sixteenth sample of the reference samples stored in the ROM 285, is denoted as s. Thus, the leading edge of vertical sync is represented by nine complex sample values.

The next step in the algorithm is to differentiate the vectors r and s This may be accomplished by subtracting the ith entry from the (i+1)st entry for each entry in the vector or by multiplying each of the vectors r and s by a matrix A, defined by equation (3).

$$A = \begin{vmatrix} -1 & +1 & 0 & 0 & \ldots 0 & 0 \\ 0 & -1 & +1 & 0 & \ldots 0 & 0 \\ 0 & 0 & -1 & +1 & \ldots 0 & 0 \\ \ldots & \ldots & \ldots & \ldots & \ldots & \ldots \\ 0 & 0 & 0 & 0 & \ldots -1 & +1 \end{vmatrix} \quad (3)$$

The resulting differentiated vectors are denoted r' and s', respectively. The next step in the procedure is to correlate r' and s' to develop a vector $r'_m$. The entries of this vector are developed according to the equation (4).

$$r'_m[n] = \sum_{i=1}^{8} s'^*[i] \, r'[i + n - 1], n = 1, 2, \ldots 760 \quad (4)$$

where $s'^*$ indicates the complex conjugate of s'. The magnitude of the absolute value of $r'_m[n]$ is an indication ghost image of the leading edge of vertical sync exists at sample time n+4. If the magnitude of $r'_m[n]$ is greater than a threshold value the microprocessor examines values of $r'_m$ adjacent to the value at index n and finds the central value, q, in a group of values which exceed the threshold. The sample index q+4 is used as a preliminary ghost delay value. The threshold value used in this test is a function of the signal to noise ratio (SNR) of the received video signal. Desirably, the threshold value is as low as possible to detect even low level ghost signals but not so low that noise in the input video signal is interpreted as a ghost signal. In the present embodiment of the invention, the threshold value is set to twice the root-mean square (RMS) of the differential noise value. The RMS noise value may be determined, for example, by monitoring the video signal during the vertical blanking interval over several field intervals.

Assuming that there exist a direct signal and K-1 ghost signals in the received video signal, where K is an integer, the estimated delays provided by the algorithm described above may be represented by a vector $\hat{\tau}$ described by equation (5).

$$\hat{\tau} = \begin{vmatrix} \hat{\tau}_1 \\ \hat{\tau}_2 \\ \ldots \\ \hat{\tau}_K \end{vmatrix} \quad (5)$$

where $\hat{\tau}_i$ is the delay estimate for the ith path. A ghosted training interval can be synthesized by weighting the reference sync values, obtained from the ROM 285, using these delay values. The synthesized training interval may be represented by the equation (6).

$$\hat{r} = \hat{S}\hat{a} \quad (6)$$

Where $\hat{r}$ is the synthesized observation vector, represented by equation (7), $$\hat{r} = \begin{vmatrix} \hat{r}[1] \\ \hat{r}[2] \\ \ldots \\ \hat{r}[M] \end{vmatrix} \quad (7)$$

is the reference signal matrix, represented by equation (8)

$$\hat{S} = \begin{vmatrix} s(T_s - \hat{\tau}_1) & s(T_s - \hat{\tau}_2) & \ldots & s(T_s - \hat{\tau}_K) \\ s(2T_s - \hat{\tau}_1) & s(2T_s - \hat{\tau}_2) & \ldots & s(2T_s - \hat{\tau}_K) \\ \ldots & \ldots & \ldots & \ldots \\ s(NT_s - \hat{\tau}_1) & s(NT_s - \hat{\tau}_2) & \ldots & s(NT_s - \hat{\tau}_K) \end{vmatrix} \quad (8)$$

and $\hat{a}$ is the synthesization coefficient vector, represented by equation (9).

$$\hat{a} = \begin{vmatrix} \hat{a}_1 \\ \hat{a}_2 \\ \ldots \\ \hat{a}_K \end{vmatrix} \quad (9)$$

A synthesization error vector, e, can be represented by the equation (10)

$$e = r - \hat{S}\hat{a} \quad (10)$$

Due to system noise, this error cannot be zero. The least square (LS) solution of the equation (10) for $\hat{a}$ gives a minimum norm of the error vector. This solution can be shown to be:

$$a_{LS} + (S_H S)^{-1} S^H r \quad (11)$$

where H is the conjugate-transpose operator. The least square error, $\epsilon(\tau)$, which is defined as the norm square of the least squared error vector e, is given by equation (12)

$$\epsilon(\tau) = r^H (I - \hat{S}(\hat{S}^H \hat{S})^{-1} \hat{S}^H) r \quad (12)$$

where I is an N×N identity matrix.

This least square error - and the least square solution for the vector $a_{LS}$ - are functions of the estimated delay vector, $\tau$. Since the edge detection algorithm described above can only provide rough estimates of the relative delays of the ghost signals, this least square error can be used to indicate the accuracy of the delay estimate, the smaller the error the better the estimate of $\hat{\tau}$. Thus, we can search in the $\hat{\tau}$ space for minimum least square error. Once the optimal $\hat{\tau}$ is reached, the corresponding reference signal matrix is substituted back into (11) to compute the optimal estimate of the synthesization coefficient vector. Note that, during the search procedure, the entires of $\hat{\tau}$ are not restricted to be integral multiples of the sampling interval.

The oversampled vertical sync signal stored in the ROM 285 is used in the present embodiment of the invention to determine the fractional delay time to be added to each of the $\hat{\tau}$'s which were calculated above. In the algorithm described below, the least square error, $\epsilon(\tau)$, is used to determine whether a selected delay value is closer to the actual delay than the previously selected delay value.

The inventors have determined that the equation (12) which defines the least square error may be simplified by a singular value decomposition of the matrix $\hat{S}$. Let:

$$\hat{S} = U \Lambda V^H \quad (13)$$

where $\hat{S}$ is an N×K matrix as set forth above, U is an N×N unitary matrix, V is a K×K unitary matrix and $\Lambda$ is an N×K diagonal matrix described in the equation (14).

$$\Lambda = \begin{vmatrix} \lambda_1 & 0 & 0 & \ldots & 0 \\ 0 & \lambda_2 & 0 & \ldots & 0 \\ \ldots & \ldots & \ldots & \ldots & \ldots \\ 0 & 0 & 0 & \ldots & \lambda_K \\ \ldots & \ldots & \ldots & \ldots & \ldots \\ 0 & 0 & 0 & \ldots & 0 \end{vmatrix} \quad (14)$$

where the values of $\lambda_1, \lambda_2 \ldots \lambda_K$ are determined by the singular value decomposition operation.

If $U_1$ is defined as the left-most K columns in U the equation (12) can be reduced to $$\epsilon(\hat{\tau}) = r^H (I - U_1 U_1^H) r \quad (15)$$

The singular value decomposition of a matrix is described in section 2.5 of a book by J. C. Nash entitled "Compact Numerical Methods For Computers: Linear Algebra and Function Minimisation", John Wiley & Sons, 1979, pp. 21-22, which is hereby incorporated by reference.

Figure 5:
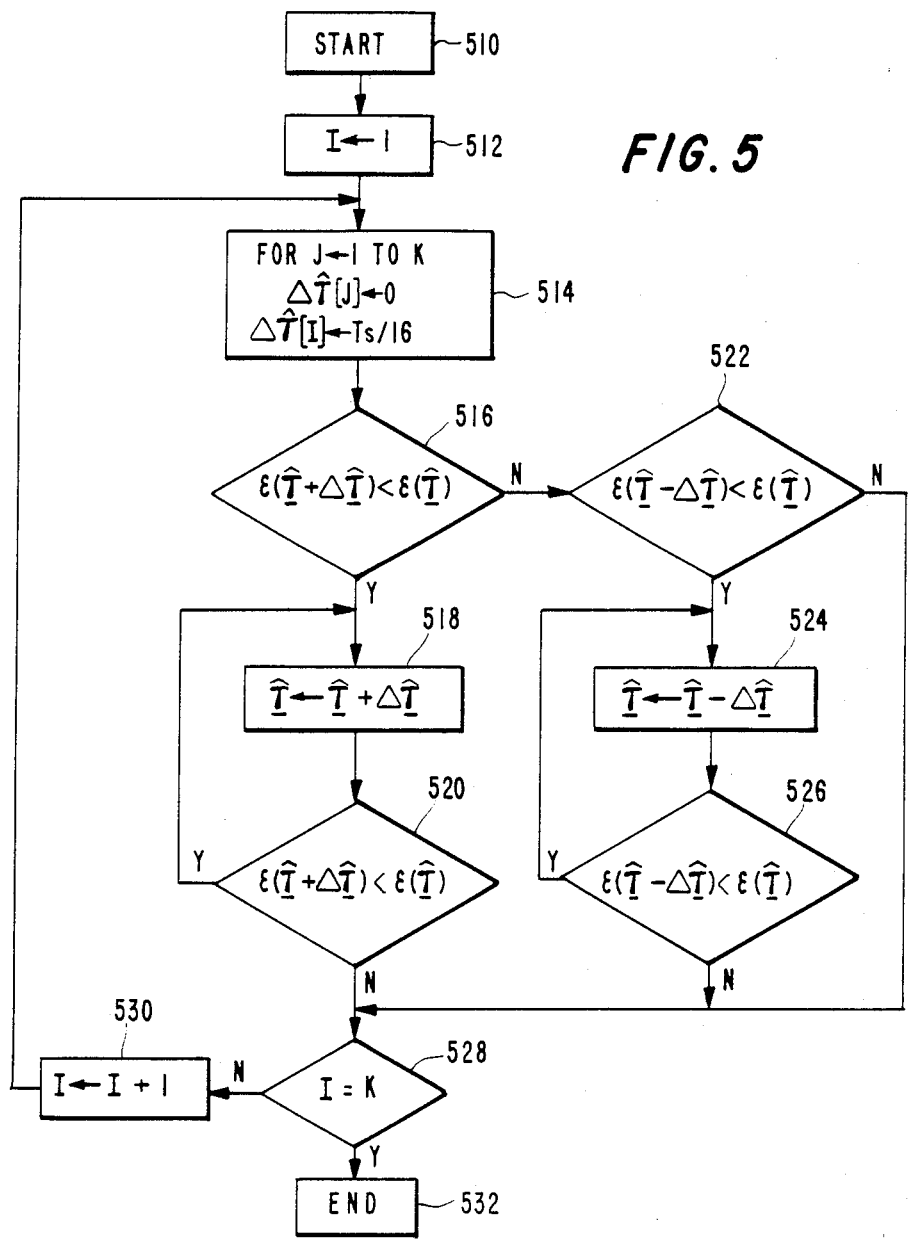
FIG. 5 is a flow chart that is useful in explaining the operation of the microprocessor shown in FIG. 2.

The algorithm for searching the space for the $\hat{\tau}$ space for the minimum least square error is shown in the flow chart of FIG. 5.

In FIG. 5, $\hat{\tau}$ is the vector defined in equation (5) and $\epsilon(\hat{\tau})$ is the function defined in equation (15). The algorithm described by the flow chart in FIG. 5 adjusts the value of the ghost delays one at a time. With each adjustment, the least square error is evaluated until a local minimum of this value is encountered.

In step 512, the variable I is set to a value of 1, this variable holds the value of the delay time which is to be adjusted. In step 514, all values of a vector $\Delta \hat{\tau}$ are set to zero except the Ith entry. This entry is set to the sample time, $T_s/16$, of the reference sample vector stored in the ROM 285 (i.e. $1/(64f_c)$).

In step 516, the function is evaluated using the vector $\hat{\tau}$ and the vector $\hat{\tau} + \Delta \hat{\tau}$. This is equivalent to using samples from the reference data that coincide with the sample times in the vector $\hat{\tau}$ and samples from the reference data that coincide with the vector $\hat{\tau} + \Delta \hat{\tau}$ in the function $\epsilon(\hat{\tau})$. If the value of the function $\epsilon(\hat{\tau})$ is less when the ghost delay for the Ith ghost is increased, the steps 518 and 520 continue to increase this ghost delay until a minimum value for the function $\epsilon(\hat{\tau})$ is reached.

Alternatively, if the value of the function $\epsilon(\hat{\tau})$ at $\hat{\tau} + \Delta \hat{\tau}$ is greater than at $\hat{\tau}$, the steps 522, 524 and 526 decrement the delay for the Ith ghost until a minimum value for the function $\epsilon(\hat{\tau})$ is reached. When the optimum delay value for the Ith ghost signal has been obtained, step 528 determines if more ghost delays are to be optimized. If I is less than K, I is incremented in step 530 and the next ghost delay value is optimized, otherwise, the algorithm ends at step 532.

Using the procedure described above, one can derive the optimal estimates of the synthesization delay vector and the synthesization coefficient vector. Denoting them as $\hat{\tau}_{opt}$ and $\hat{a}_{opt}$, respectively, the optimal estimate of the transfer function for the transmission channel, $\hat{h}_{opt}(t)$ is given by equation (16).

$$\hat{h}_{opt}(t) = \sum_{i=1}^{K} \hat{a}_{iopt} \delta(t - \hat{\tau}_{iopt}) \quad (16)$$

Where the $\hat{a}_{iopt}$ and $\hat{\tau}_{iopt}$ are the respective ith entries of the vectors $\hat{a}_{opt}$ and $\hat{\tau}_{opt}$.

As set forth above, once the transfer function of the transmission channel has been determined, a ghost cancellation filter may be designed by inserting the delay and coefficient values of this transfer function into an IIR filter. In the algorithm presented above, the starting time for the vector of ghost delay times, $\hat{\tau}$, is not fixed. Due to variations in the sixth equalization pulse detector 246, the timing of the samples taken by the microprocessor 282 may vary significantly from field to field. To compensate for this variation, the ghost cancellation system used in this embodiment of the invention sets the delay values in the IIR filter to the relative delay values between the term in the transfer function that has the largest magnitude and all subsequent terms. The term with the largest magnitude corresponds to the leading edge of vertical sync, and, as set forth above, all of the subsequent terms are assumed to correspond to ghosts of the leading edge of vertical sync. In addition to adjusting the delay values of the transfer function $\hat{h}_{opt}(t)$ to be relative to the leading edge of vertical sync, the microprocessor 282 scales the values of the coefficients of the terms of the transfer function which have delay times greater than or equal to that of the leading edge of vertical sync by the inverse of the coefficient value for the leading edge of vertical sync. If, for example, the Lth coefficient value corresponds to the leading edge of vertical sync, the equation (16) would become, $$\hat{h}'_{opt}(t) = \sum_{i=L}^{K} (\hat{a}_{iopt}/\hat{a}_{Lopt}) \delta(t - (\hat{\tau}_{iopt} - \hat{\tau}_{Lopt})) \quad (17)$$

Since the terms in the transfer function $\hat{h}_{opt}(t)$ having time delay values less than that of the leading edge of vertical sync may be ignored in synthesizing the ghost cancellation filter, the values of the observed vector, r, corresponding to these terms may also be ignored. The effect of eliminating these values is to reduce the value of N, reducing the computational overhead of the algorithm described above. This reduction in the number of samples may be achieved by locating the leading edge of vertical sync in the observed vector r and eliminating samples which precede it by more than, for example, ten sample periods. This may be done prior to any of the matrix operations set forth above.

When the time delay values of the terms of the transfer function $\hat{h}'_{opt}(t)$ occur at integral multiples of the sampling period, there is a one-to-one correspondence between the taps of the IIR filter and the terms of the transfer function $\hat{h}'_{opt}(t)$.

Figure 6:
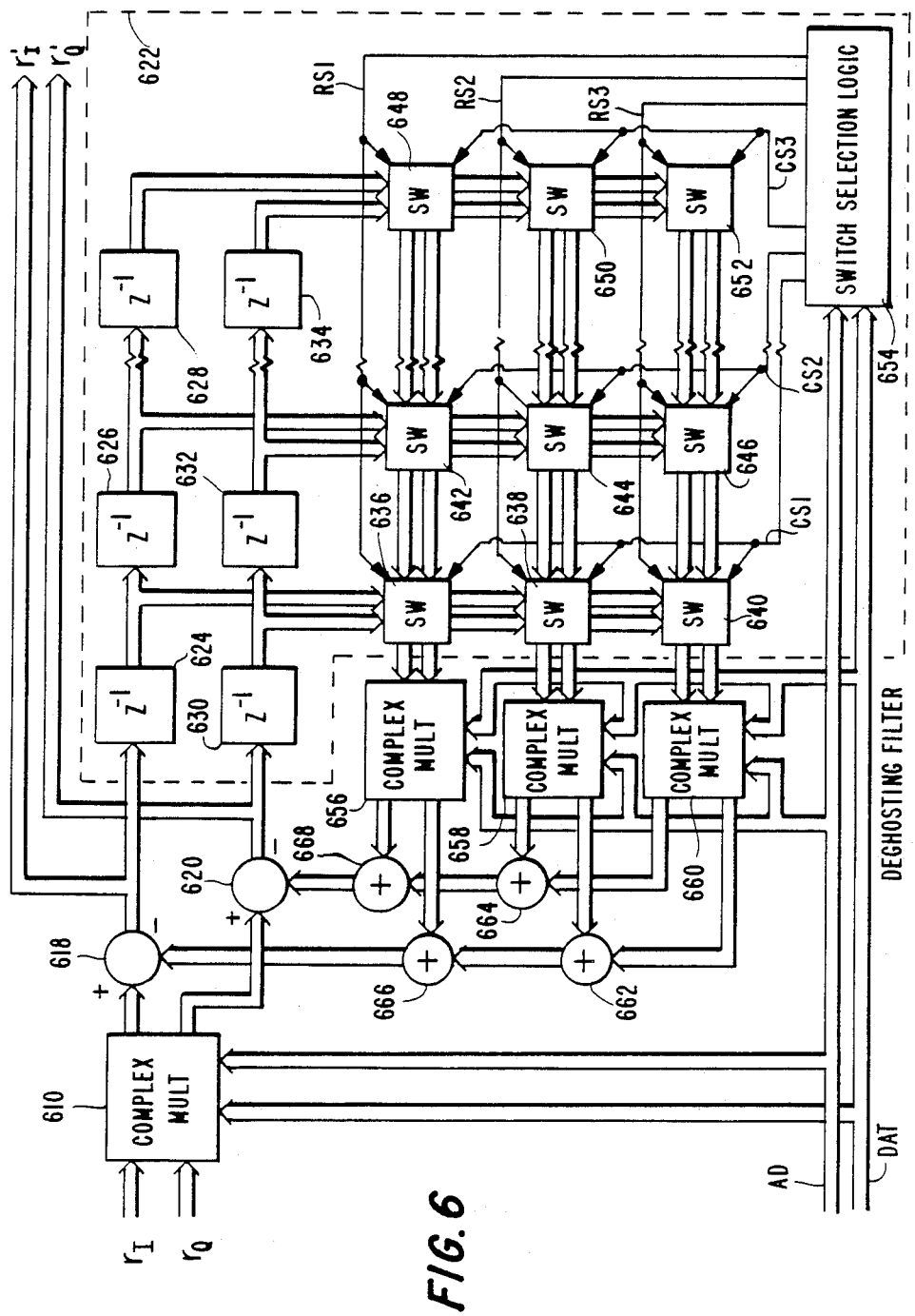
FIG. 6 is a block diagram of a deghosting filter suitable for use in the circuitry shown in FIG. 2.

The deghosting filter 280 used in this embodiment of the invention is shown in FIG. 6. In the deghosting filter, the in-phase, $r_I$, and quadrature phase, $r_Q$, components of the received video signal are applied to the signal input ports of a complex multiplier 610. The real and imaginary parts of the inverse of the complex coefficient $a_{Lopt}$ are applied to the coefficient input ports of the complex multiplier 610 by the microprocessor 282 via the address bus, AD, and data bus, DATA. In the present embodiment of the invention, the microprocessor 282 stores the values of the filter coefficients into the complex multipliers as if it were storing values into the RAM 284.

Figure 7:
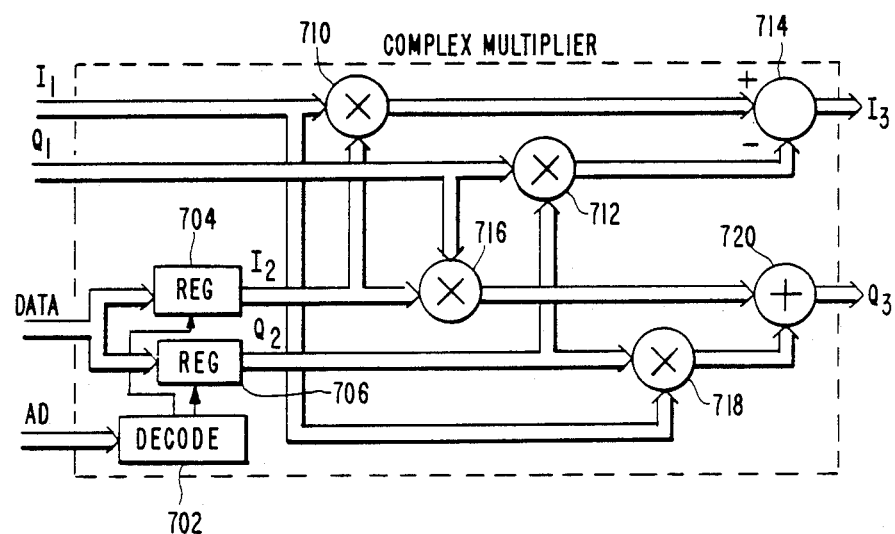
FIG. 7 is a block diagram of a complex multiplier suitable for use in the deghosting filter shown in FIG. 6.

FIG. 7 is a block diagram of a complex multiplier suitable for use in the present embodiment of the invention. In FIG. 7, the bus DATA is coupled to the respective input ports of two eight-bit parallel input, parallel-output registers 704 and 706. The address bus, AD, is coupled to the input port of a decoding circuit 702. The circuit 702 is responsive to one predetermined value, applied via the bus AD, to pulse a load input signal for the register 704 and responsive to another predetermined value to pulse a different load input signal for the register 706. When the microprocessor 282 loads a coefficient value into one of the complex multipliers used in the deghosting filter 280, it simultaneously applies the real part of the coefficient, via the bus DATA and, the address value which pulses the load signal for the register 704, via the bus AD. Next, the microprocessor applies the imaginary part of the coefficient value via the bus DATA and, the address value which pulses the load signal for the register 706, via the bus AD.

The in-phase and quadrature components of the video signal, $I_1$ and $Q_1$, respectively, are multiplied by the in-phase and quadrature coefficient values, $I_2$ and $Q_2$, respectively, by the circuitry which includes the multipliers 710, 712, 716 and 718; the subtracter 714 and the adder 720. The multiplier 710 forms the product of the signal $I_1$ and the coefficient value $I_2$ and applies the result to the subtracter 714. The subtracter 714 subtracts the product of the signal $Q_1$ and the coefficient $Q_2$, provided by the multiplier 712, from the product provided by the multiplier 710 to produce the in-phase output value, $I_3$. The multiplier 716 forms the product of the signal $Q_1$ and the coefficient value $I_2$ and applies this product to one input port of the adder 720. The multiplier 718 multiplies the signal $I_1$ by the coefficient value $Q_2$ to generate a second input signal to the adder 720. The output signal provided by the adder 720 is the quadrature signal $Q_3$.

The multiplication operation performed by the multiplier 610 corresponds to the denominator of the each term of the summation in equation (17) (i.e. $1/a_{Lopt}$). This may be considered to be a proportioning of the direct component of the video signal since this coefficient corresponds to the leading edge of vertical sync.

Referring to FIG. 6, the in-phase and quadrature signals provided by the multiplier 610 are applied to respective minuend input ports of subtracters 618 and 620, respectively. The subtracters input ports of the subtracters 618 and 620 are coupled to receive ghost correction signals from adders 666 and 668, respectively. The output signals provided by the subtracters 618 and 620 are the corrected in-phase and quadrature signals, $r_I'$ and $r_Q'$, respectively. As set forth above, in reference to FIG. 2, the signal $r_I'$ is the output signal of the deghosting filter 280.

To simplify the explanation of the ghost cancellation system, the deghosting filter 280 is, for the purpose of this initial description, restricted to having only three taps. As set forth below, it may be desirable for the filter to have a larger number of taps. A filter of this type may be readily designed by one skilled in the art of digital signal processing circuit design as a straightforward extension of the filter shown in FIG. 6.

A programmable three tap delay line 622 provides the three delayed signals for the IIR deghosting filter. The delay line 622 includes two groups of N serially connected delay elements. Each of these delay elements is coupled to the sampling clock signal, CK, and provides a time delay of approximately 70 ns ($1/(4 f_c)$). The first group of delay elements—of which the first two, 624 and 626 and the last one, 628, are shown—delay the in-phase component of the video signal. The quadrature component of the video signal is delayed by a second group of delay elements of which the first two, 630 and 632, and the last one, 634 are shown.

The output ports of corresponding delay elements in the in-phase and quadrature delay chains are connected to common switch elements in a crossbar switching matrix. For example, the output ports of the delay elements 624 and 630 are coupled to the switch element 636 and, through the switch element 636, to the switch elements 638 and 640. In the same manner, the output ports of the delay elements 626 and 632 are coupled to the switch elements 642, 644 and 646 and the output ports of the delay elements 628 and 634 are coupled to the switch elements 648, 650 and 652. Each of these three sets of switch elements define a column in the crossbar switching matrix. The switches in each row of the matrix are coupled to each other and to a respectively different complex coefficient multiplier. The switches 636, 642 and 648 are coupled to the multiplier 656; the switches 638, 644 and 650 are coupled to the multiplier 658; and the switches 640, 646 and 652 are coupled to the multiplier 660. The complex multipliers 656, 658 and 660 are identical to the complex multiplier 610 described above in reference to FIG. 7.

Each of the switch elements in the matrix is responsive to a row select signal (RS1, RS2 or RS3) and a column select signal (CS1, CS2 or CS3) provided by switch selection logic 654 to couple the output signals provided by a selected pair of delay elements to a multiplier. In this embodiment of the invention, only one switch in any row and one switch in any column is energized at any given time. The switch selection logic 654 is controlled by values provided by the microprocessor 282 via the busses AD and DAT. The value provided by the bus AD indicates which of three possible row/column selection values is being applied by the microprocessor 282 via the bus DAT. These values are stored internally by the switch selection logic and used to activate the indicated switch elements which provide the delayed signals to the respective multipliers. A programmable tapped delay line of this type is described in U.S. Pat. No. 4,727,424 entitled "Sampled Data Filtering System, Including A Crossbar Switch Matrix, As For A Ghost Cancellation System", which is hereby incorporated by reference.

As set forth above, in this embodiment of the invention, the delay values in the equation (17) are assumed to be in terms of integral numbers of sampling intervals. Consequently, each term in the summation of equation (17), except the first, corresponds to one tap on the in-phase and quadrature delay lines and to one of the coefficient multipliers 656, 658 and 660. Accordingly, the microprocessor 282 applies, via the busses AD and DATA, the in-phase (real) and quadrature (imaginary) components of respectively different ones of the coefficients of the equation (17) to each of the multipliers 656, 658 and 660.

The in-phase signals provided by the multipliers 658 and 660 are summed in an adder 662. The combined signal provided by this adder is, in turn, summed with the in-phase signal provided by the multiplier 656 in the adder 666. As set forth above, the signal provided by the adder 666 is the in-phase component of the ghost correction signal that is applied to the subtracter 618.

The quadrature signals provided by the m' multipliers 658 and 660 are summed by an adder 664 and the resultant sum is applied to the adder 668. The adder 668 adds this value to the quadrature signal provided by the multiplier 656 to develop the quadrature component of the ghost cancellation signal which is applied to the subtracter 620. As set forth in the Thedick reference, an IIR filter such as that shown in FIG. 6 will effectively cancel multipath distortion in a video signal when there is one tap of the delay line and one coefficient multiplier for each ghost signal component of the received video signal.

To simplify the explanation of the entire ghost cancellation system, it was assumed above, that each ghost signal is delayed with respect to the direct signal by an amount of time that is an integral multiple of the sampling interval. When this is not true, that is, when a ghost signal is delayed by an amount of time which is not an integral multiple of the sampling interval, modifications may be desirable to the system described above to achieve effective ghost signal cancellation. In general, an IIR filter may be modified to cancel ghost signals having delay times interstitial to two successive delay times which may be obtained from a tapped delay line, if an interstitially delayed signal is interpolated from the available delayed signals and used as a tap of the IIR filter. Two methods of interpolation are presented below. The first method involves a straightforward extension of the structure shown in FIG. 6 which adds more rows of switch elements to the crossbar matrix and more complex multipliers. In addition, the microprocessor 282 is programmed to calculate additional coefficient values for taps surrounding the fractional sample delay. The second method inserts an interpolator circuit at each output port of the variable delay line. This interpolator is responsive to a signal produced by the microprocessor 282 to provide in-phase and quadrature signals having effectively the same delay as the ghost signal.

The following is an explanation of the calculations which constitute the algorithm to derive the additional coefficients values for the first method described above. For all ghost delays, $\tau_i$, let:

$$k_i = INT(\tau_i/T_s) \quad (18)$$

where $T_s$ is the sampling interval $(1/4f_c)$ and INT(x) gives the largest integer that is not greater than x. Furthermore, let $P_{ij}$ represent one delay value in a group of delay values, which includes $k_i$, and which correspond to possible delay line taps surrounding the ith ghost signal delay. In the algorithm described below, the ith ghost cancellation signal is interpolated from $J_i$ successive taps of the delay line. To differentiate the coefficient values in the present algorithm from those used in the algorithm to derive the equivalent channel response, the present coefficient values are denoted as $b_{ij}$. Moreover, to simplify the complex matrix equations used in this algorithm, the value L in equation (17) is assumed to be equal to one and the leading edge of vertical sync is assumed to occur at $\tau_1 = 0$.

When the assumptions set forth above are substituted into the equation (17), an equation (19) is obtained.

$$\hat{h}_{opt}''(t) = \sum_{i=1}^{K} \sum_{j=1}^{J_i} b_{ij} \quad (19)$$

In this equation, the optimal values of the coefficients, $b_{ij}$, are unknown.

As set forth above, the observed vector r may be closely approximated according to the equation (20).

$$\hat{\tau} \approx \hat{\tau}_{opt} = \hat{S}_{opt} \hat{a}^T_{opt} \quad (20)$$

where $\hat{S}_{opt}$ is the reference signal matrix described by equation (8) where $\hat{\tau} = \hat{\tau}_{opt}$.

For the present algorithm, only the last row of the reference signal matrix, the vector $\hat{S}_{-opt}T_{(N)}$, need be considered. Under this constraint, the equation (20) becomes:

$$\hat{\tau}_{opt}[N] = \hat{S}_{opt}[N]^T \hat{a}_{opt} \quad (21)$$

where $$\hat{S}_{opt}[N] = \begin{vmatrix} \hat{s}(NT_s - \hat{\tau}_{1opt}) \\ \hat{s}(NT_s - \hat{\tau}_{2opt}) \\ \ldots \\ \hat{s}(NT_s - \hat{\tau}_{Kopt}) \end{vmatrix} \quad (22)$$

From the transfer function defined by equation (19), an equation (23) similar to the equation (21) can be derived.

$$y[N] = \bar{s}[N]^T b \quad (23)$$

where $y[N]$ is an approximation of $\hat{\tau}[N]$ and $\bar{s}[N]$ is a reference signal vector defined by equation (24), $$\bar{s}[N] = \begin{vmatrix} s((N-p_{11})T_s) \\ s((N-p_{21})T_s) \\ \ldots \\ s((N-p_{KJK})T_s) \end{vmatrix} \quad (24)$$

and the coefficient vector b is defined by the equation (25).

$$b = \begin{vmatrix} b_{11} \\ b_{21} \\ \ldots \\ b_{KJK} \end{vmatrix} \quad (25)$$

The inventors have determined that the coefficient values b may be determined by obtaining the minimum mean square error between $\hat{\tau}_{opt}[N]$ and $y[N]$ when the $p_{ij}$'s are selected in advance. This solution is represented by the equation (26).

$$b_{MMSE} = \{E(\bar{s}^* \bar{s}^T)\}^{-1} \{E(\bar{s}^* \bar{s}^T_{opt}) \quad (26)$$

Where * represents the conjugate operator, T represents the transpose operator and E( ) represents the expectation operator when the vectors are treated as random vectors. The time index N is dropped since the processes are stationary. In this embodiment of the invention the term $E(\bar{s}^* \bar{s}^T)$ is equivalent to the covariance matrix between $\bar{s}^*$ and $\bar{s}^T$ and $E(\bar{s}^* \bar{s}^T)$ is equivalent to the cross-covariance s matrix between $\bar{s}^*$ and $\hat{s}^T_{opt}$. In the calculations which evaluate the equation (26), the vectors $\bar{s}$ and $\hat{s}_{opt}$ are transformed to be zero-mean vectors and are assumed to have a flat spectral density within the video frequency range. A discussion of random variables and their properties including a discussion of the covariance matrix may be found in chapters 9 and 10 of a book by G. R. Cooper and C. D. McGillem entitled *Methods of Signal and System Analysis*; Holt, Rinehart, Winston, 1967, which is hereby incorporated by reference.

The coefficient vector $b_{MMSE}$ determined by this method may be used to set the coefficient values for the IIR filter where the delay values are determined by the defined by the equation (27).

$$p = \begin{vmatrix} p_{1,1} \\ p_{2,1} \\ p_{2,2} \\ \ldots \\ p_{K,JK} \end{vmatrix} \quad (27)$$

The inventors have determined that, when the ghost time, $\tau_i$, is substantially equal to $k_i T_s$, that $J_i$ may be set to a value of one. When, however, there is a significant difference between $\tau_i$ and $k_i T_s$, setting $J_i$ to a value of four produces more satisfactory results. Using this scheme, two samples before and two samples after the fractional ghost delay are interpolated to obtain an equivalent sample having the fractional ghost delay.

Figure 8:
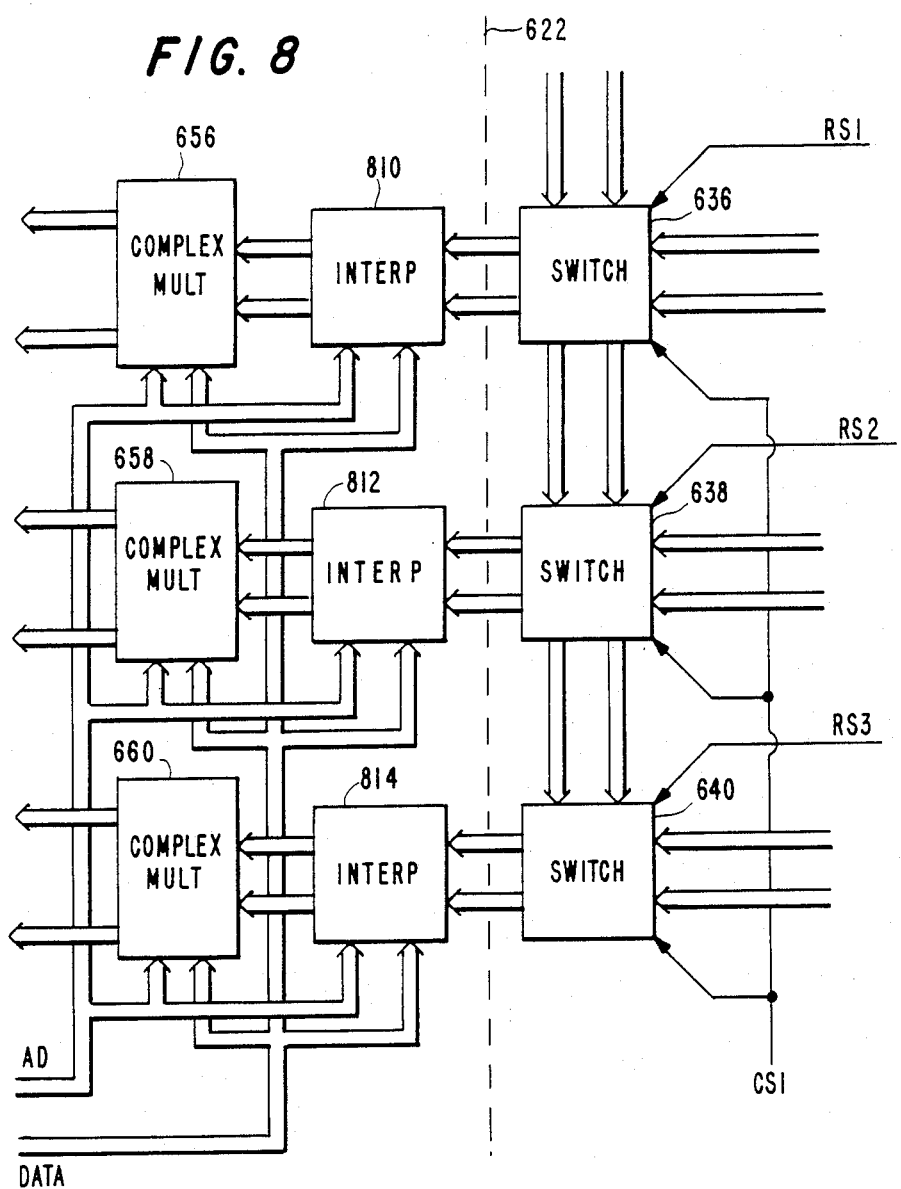
FIG. 8 is a block diagram of a portion of the deghosting filter shown in FIG. 6 which illustrates an alternate embodiment of the invention.

The algorithm set forth above is implemented in a computer program, written in the FORTRAN 77 computer language. This program is included in the appendix of the present application An alternative to the interpolation scheme described above is to insert sample value interpolation circuitry between the output ports of the programmable delay line 622 and the signal input ports of the coefficient multipliers, 656, 658 and 660, as shown in FIG. 8. Each of interpolators, 810, 812 and 814, shown in FIG. 8, includes two compensated linear interpolators which may be, for example, of the type shown in FIG. 9. The compensated interpolator shown in FIG. 9 includes a linear interpolator, 920, which averages the values of successive samples according to a proportioning factor F, to produce an interpolated sample value. By averaging the samples, the interpolator performs the function of a low-pass filter. This filtering of the video samples may produce undesirable phase and amplitude errors in the interpolated signal To compensate for these errors, the interpolator shown in FIG. 9 includes a compensation filter, 950. The amount of compensation provided to the interpolated signal depends on the value of the proportioning factor F.

Referring to FIG. 8, in this embodiment of the invention, the proportioning factors are applied to the interpolators 810, 812 and 814 by the microprocessor 282. Both of the interpolation circuits in an interpolator are provided with the same factor value, F. The value of F applied to each of the interpolators 810, 812 and 814 may be different, however, since this value is the fractional part of the delay value $\tau_i$ associated with the ith ghost signal (i.e. $\tau_i = \tau_{iopt} - \tau_{Lopt}$). The value F is applied to the input port of a register 932 of the interpolator circuit via the bus DATA while a value applied, via the bus AD, to a decoder 330 conditions the decoder to pulse the register 932, causing it to load the value applied to its input port. The value in the register 932 is applied to the address input port of a ROM 934 which provides a value (1-F) to the linear interpolator 920 and provides a value C to a multiplier 936. The value of C determines the magnitude of the compensation signal which is added to the interpolated signal by an adder 960.

Figures 1, 10:
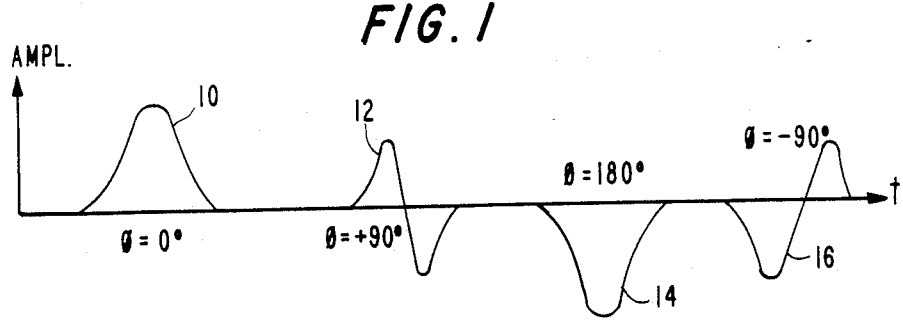
FIG. 1, referred to above, is a waveform diagram of arbitrary ghost signals relative to a direct signal which is useful for explaining the environment in which the present invention operates.
FIG. 10 is a table of values which illustrates the programming of the ROM shown in FIG. 9.

FIG. 10 is a table which illustrates the programming of the ROM 934 for an interpolator circuit having a granularity of $(\frac{1}{8})T_S$.

Figure 9:
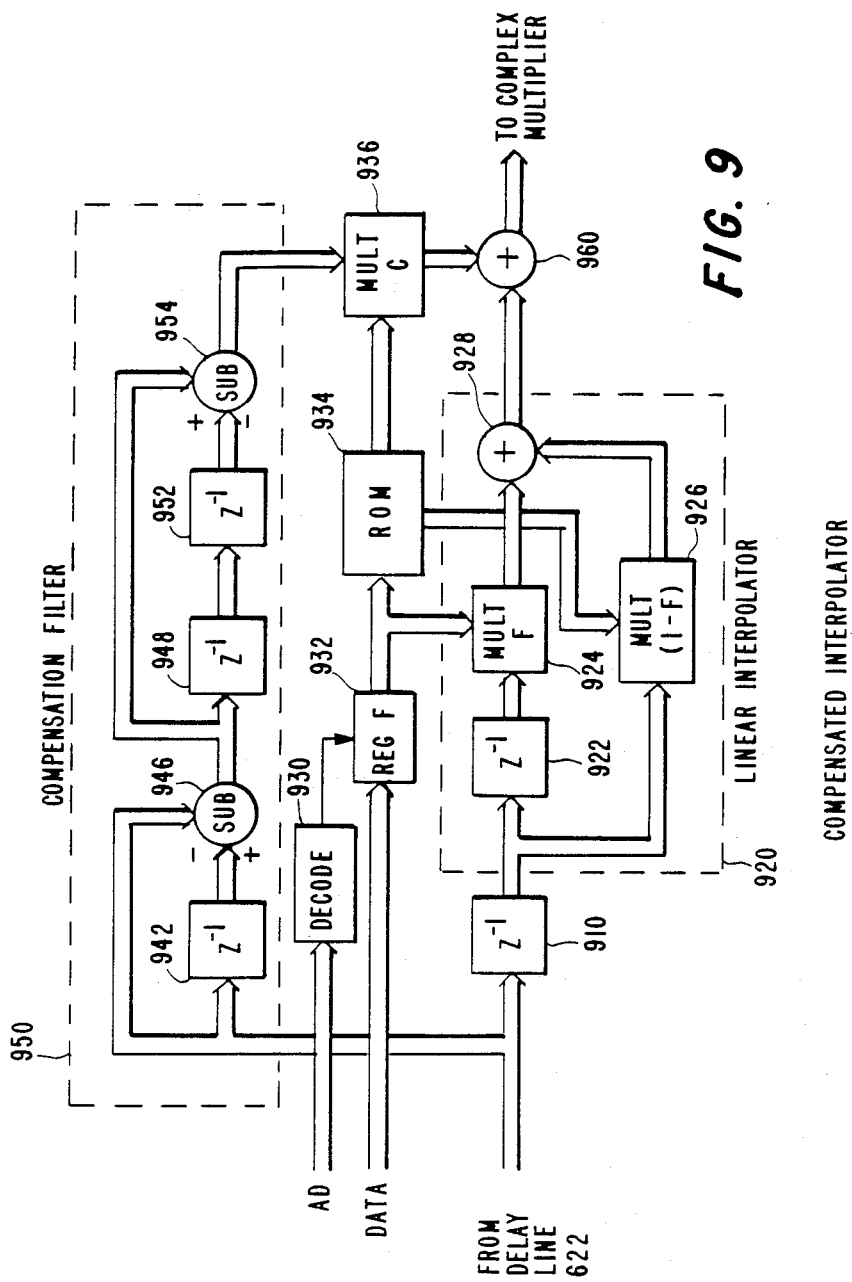
FIG. 9 is a block diagram of an interpolator circuit suitable for use in the alternative embodiment of the invention shown in FIG. 8.

The interpolation circuitry shown in FIG. 9 is described in detail in U.S. Pat. No. 4,694,414 entitled "Digital Delay Interpolation Filter With Amplitude And Phase Compensation", which is hereby incorporated by reference.

In the context of the algorithm presented above for developing a ghost cancellation filter from a calculated transfer function of the transmission channel, this interpolation circuitry is used as follows. When the microprocessor 282 applies the delay values from the equation (17) to the programmable delay line 622 of the deghosting filter 280, it apportions the delay values between the delay line 622 and a selected one of the interpolators 810, 812 or 814. The amount of the delay value, $\tau_i$, which is realized by the programmable delay 622 is substantially equal to the integer part of the quantity $\tau_i/T_S$ minus 1, times $T_S$. The remainder of the delay value, $T_S$ plus the fractional part of $T_S$, is realized in the selected interpolator by applying the fractional part of the value $\tau_i$ as the proportioning factor F. The extra sample period of delay is inherent to the selected interpolator, as set forth in the TOTAL-DELAY column of the table in FIG. 10.

To compensate for the effects of system noise on the deghosting system presented above, it is contemplated that several estimates of the transmission channel (i.e. equation 17) may be made over several video field intervals and that the coefficient and delay values from these estimates may be averaged to obtain the final coefficient and delay values for use by the deghosting filter 280.

While the ghost cancellation system described above is a digital system which removes multipath distortion from video signals, it is contemplated that the invention may also be implemented using analog components and used to remove multipath distortion from other types of signals.

```
c  dg.for (de_ghoster)                         6-24-86
c
          common/WINDOW/NX,NY,NT
c
          character*20 fn
          integer*2 rx_r(910,1050), rx_i(910,1050)
          integer nl_vs, npx_vs_bg
          integer ixoff, iyoff, iysep
          integer npx_ob
          integer ix, iy
          integer ians
          integer npx_vs1, npx_vs2
          integer nrx_vs
          complex rx_vs(910)
          integer nrx_vs1
c
          integer nl_av, npx_av_bg
c         complex rx_av(910)
c
          complex sf(20)
          integer nsf, nsf1
c
          complex sfd(200)
          integer nsfd, nsfd1, nssfd
c
          complex am(20)
          integer nam
c
          complex rxp(910)
          integer nrxp
c
          complex sfp(20)
          integer nsfp
c
          complex rxpm(910)
          integer nrxpm
c
          real th
          integer lrxpm(910), nlrxpm
c
          integer p_sep
          integer pk(20), npk
          integer pk_tp(20), ipk
c
          integer nwin1, nwin2, n_search
          integer ledge(20), nledge
```

```
c
      complex sfm(910,20)
      integer nsfm1, nsfm2
c
      complex sgg(910,20)
      integer nsgg1, nsgg2, nssg
c
      real taug(20)
      real taug_tp(20)
      integer ntaug
c
      complex a_ls(20), a_ls_tp(20)
      integer na_ls
c
      real cond, error
      real cond_tp, error_tp
c
      complex d
c
      complex hx(20), hy(20)
      integer kx(20), kkx, ky(20), kky
      complex sb(20)
c
      integer iline, ipixel
      complex x, y
c
      integer*2 rx_r_dg(910,1050), rx_i_dg(910,1050)
c
c terminal initialization
c dvf start (define sampling rate, filenames)
      call initt (240)
c
      call dvfmap(3)
      print *,' '
      print *,'define input file real part'
      call chdef (1,4,1,0)
      print *,' '
      print *,'define input file imaginary part'
      call chdef (2,4,1,0)
      print *,' '
      print *,'define output file real part'
      call chdef (3,4,1,0)
c
      print *,'enter summary file name, fn ?'
      read (5,1) fn
   1  format (a20)
      open (10,file=fn//'.sum',status='unknown')
      open (11,file=fn//'.dat',status='unknown')
c
c read in video data file
      print *,'------- reading input files -------'
      call readit (1,4,0,rx_r)
      print *,'real part input done'
      type *,char(7)
      call readit (2,4,0,rx_i)
      print *,'imaginary part input done'
      type *,char(7)
      type *,char(7)
c
c vertical sync finder
      print *,'------- vertical sync finder -------'
 100  print *,'enter line number, begining pixel, to be viewed,'
```

```
      print *,'nl_vs, npx_vs_bg ?'
      read (5,*) nl_vs, npx_vs_bg
c
      call initt (240)
c
      ixoff = 50
      iyoff = 100
      iysep = 300
c
c no. of pixels to be observed
      npx_ob = 910
      call waveform (rx_r,rx_i, nl_vs, npx_vs_bg, npx_ob,
     &                    ixoff, iyoff, iysep)
      call movabs (ixoff, 700)
      call anmode
      print *,'read top or bottom wavefrom, 1(top)/0(bot) ?'
      read (5,*) ians
      if (ians.eq.1) then
         call scrn_read (ix, iy, ixoff, iyoff+iysep)
      else
         call scrn_read (ix, iy, ixoff, iyoff)
      endif
c
      print *,'observe signal, 1/0  ?'
      read (5,*) ians
      if (ians.ne.0) goto 100
c
c define vertical observation interval in line nl_vs
 200  print *,'enter begining of the observation interval npx_vs1 ?'
      call scrn_read (ix, iy, ixoff, iyoff)
      npx_vs1 = ix + npx_vs_bg - 1
      print *,'begining of vs observation interval ',npx_vs1
      print *,'change, 1/0 ?'
      read (5,*) ians
      if (ians.ne.0) goto 200
c
 300  print *,'enter end of the observation interval npx_vs2 ?'
      call scrn_read (ix, iy, ixoff, iyoff)
      npx_vs2 = ix + npx_vs_bg - 1
      print *,'end of vs observation interval ',npx_vs2
      print *,'change, 1/0 ?'
      read (5,*) ians
      if (ians.ne.0) goto 300
c
c copy vs rx() from rx_r, rx_i
      nrx_vs = npx_vs2 - npx_vs1 + 1
      print *,'nrx_vs',nrx_vs
      do i = 1, nrx_vs
         rx_vs(i) = cmplx (float(rx_r(npx_vs1+i-1,nl_vs)),
     &                    float(rx_i(npx_vs1+i-1,nl_vs)))
      enddo
c
c active video monitor
      call initt (240)
      print *,'------- active video monitor -------'
 400  print *,'enter line number to be viewed, nl_av, npx_av_bg ?'
      read (5,*) nl_av, npx_av_bg
c
c ixoff = 50, iyoff = 100, iysep = 300, npx_ob = 910
      call initt (240)
      call waveform (rx_r,rx_i, nl_av, npx_av_bg,910, 50,100,300)
      call movabs (50, 700)
      call anmode
```

```
      print *,'read top or bottom wavefrom, 1(top)/0(bot) ?'
      read (5,*) ians
      if (ians.eq.1) then
         call scrn_read (ix, iy, 50, 400)
      else
         call scrn_read (ix, iy, 50, 100)
      endif
c
      print *,'observe another line of video waveform, 1/0   ?'
      read (5,*) ians
      if (ians.ne.0) goto 400
c
c define reference, transform, and locate vertical sync edges roughly
      call sfdef1 ( sf, nsf, nsf1,20.,230.)
      call amdef (am, nam, 1)
      call amtfm (rx_vs, nrx_vs, am, nam, rxp, nrxp)
      call amtfm (sf, nsf, am, nam, sfp, nsfp)
      call rxp_match_sfp (rxpm, nrxpm, rxp, nrxp, sfp, nsfp)
c
      ixoff = 50
      iyoff = 100
      call initt (240)
      call vt_plt_abs_c (rxpm,nrxpm,ixoff,iyoff)
      call scrn_thd (th, ixoff, iyoff)
      call thd_abs (rxpm, nrxpm, th, lrxpm, nlrxpm)
      call pause
c
      p_sep = 3
      write (10,3) th, p_sep
   3  format (/,' threshold = ',g11.4e3,'  p_sep = ',i5)
c locate peaks in rx_vs
      call peak_search (pk,npk,p_sep,lrxpm,nlrxpm,rxpm,nrxpm,nsf1)
c
c search min of least square fit in the vicinity of pk()
      nwin1 = 10
      nwin2 = 10
      na_ls = npk
      ldsfm = 910
      n_search = 1
      nssg = 4
      call sfddef1 (sfd, nsfd, nsfd1, nssfd, 20., 230.)
      call pk_ledge (ledge,nledge,nsfm1,nrx_vs1,pk,npk,nwin1,nwin2)
      call sf_mat (sfm,nsfm1,nsfm2,ldsfm, ledge,nledge, sf,nsf,nsf1)
      call ledge_taug (taug, ntaug, nssg, ledge, nledge)
      call sgg_def (sfm,nsfm1,nsfm2,ldsfm, nssg, taug,ntaug,
     &              sfd, nsfd, nsfd1, nssfd)
c
      call lsf_no_dc (a_ls,na_ls, sfm,ldsfm,nsfm1,nsfm2,
     &                rx_vs,nrx_vs1, cond, error)
      write (6,4) n_search, error, cond
      write (10,4) n_search, error, cond
   4  format (/,' n_search = ',i5,'  error = ',g11.4e3,
     &          '  cond = ',g11.4e3)
      write (6,5) (i,pk(i),a_ls(i),i=1,npk)
      write (10,5) (i,pk(i),a_ls(i),i=1,npk)
   5  format ('  i = ',i5,'  pk(i) = ',i5,
     &        '  a_ls(i) = (',g11.4e3,' , ',g11.4e3,')')
c
      do ipk = 1, npk
        pk_tp(ipk) = pk(ipk)
      enddo
c
      do ipk = 1, npk
        pk_tp(ipk) = pk_tp(ipk) + 1
```

```
            n_search = n_search + 1
            call pk_ledge (ledge,nledge,nsfm1,nrx_vs1,pk_tp,npk,nwin1,nwin2)
            call sf_mat (sfm,nsfm1,nsfm2,910, ledge,nledge, sf,nsf,nsf1)
         call ledge_taug (taug, ntaug, nssg, ledge, nledge)
         call sgg_def (sfm, nsfm1, nsfm2, ldsfm, nssg, taug, ntaug,
      &                sfd, nsfd, nsfd1, nssfd)
            call lsf_no_dc (a_ls_tp,na_ls, sfm,910,nsfm1,nsfm2,
      &                   rx_vs, nrx_vs1, cond_tp, error_tp)
            write (6,4) n_search, error_tp, cond_tp
            write (10,4) n_search, error_tp, cond_tp
            write (6,5) (i,pk_tp(i),a_ls(i),i=1,npk)
            write (10,5) (i,pk_tp(i),a_ls(i),i=1,npk)
            if (error_tp.le.error) then
500            call copy1 (a_ls_tp, a_ls, na_ls)
               pk(ipk) = pk_tp(ipk)
               error = error_tp
               cond = cond_tp
               pk_tp(ipk) = pk_tp(ipk) + 1
               n_search = n_search + 1
               call pk_ledge (ledge,nledge,nsfm1,nrx_vs1,
      &                      pk_tp,npk,nwin1,nwin2)
               call sf_mat (sfm,nsfm1,nsfm2,910, ledge,nledge, sf,nsf,nsf1)
            call ledge_taug (taug, ntaug, nssg, ledge, nledge)
            call sgg_def (sfm, nsfm1, nsfm2, ldsfm, nssg, taug, ntaug,
      &                   sfd, nsfd, nsfd1, nssfd)
               call lsf_no_dc (a_ls_tp,na_ls, sfm,910,nsfm1,nsfm2,
      &                      rx_vs, nrx_vs1, cond_tp, error_tp)
               write (6,4) n_search, error_tp, cond_tp
               write (10,4) n_search, error_tp, cond_tp
               write (6,5) (i,pk_tp(i),a_ls(i),i=1,npk)
               write (10,5) (i,pk_tp(i),a_ls(i),i=1,npk)
               if (error_tp.le.error) goto 500
               pk_tp(ipk) = pk(ipk)
c
            else
               pk_tp(ipk) = pk_tp(ipk) - 1
600            pk_tp(ipk) = pk_tp(ipk) - 1
               n_search = n_search + 1
               call pk_ledge (ledge,nledge,nsfm1,nrx_vs1,
      &                      pk_tp,npk,nwin1,nwin2)
               call sf_mat (sfm,nsfm1,nsfm2,910, ledge,nledge, sf,nsf,nsf1)
            call ledge_taug (taug, ntaug, nssg, ledge, nledge)
            call sgg_def (sfm, nsfm1, nsfm2, ldsfm, nssg, taug, ntaug,
      &                   sfd, nsfd, nsfd1, nssfd)
               call lsf_no_dc (a_ls_tp,na_ls, sfm,910,nsfm1,nsfm2,
      &                      rx_vs, nrx_vs1, cond_tp, error_tp)
               write (6,4) n_search, error_tp, cond_tp
               write (10,4) n_search, error_tp, cond_tp
               write (6,5) (i,pk_tp(i),a_ls(i),i=1,npk)
               write (10,5) (i,pk_tp(i),a_ls(i),i=1,npk)
               if (error_tp.le.error) then
                  call copy1 (a_ls_tp, a_ls, na_ls)
                  pk(ipk) = pk_tp(ipk)
                  error = error_tp
                  cond = cond_tp
               endif
               if (error_tp.eq.error) goto 600
               pk_tp(ipk) = pk(ipk)
            endif
         enddo
c
c pk -> taug
c search sub-ts in taug()
c
         ts = 0.25
```

```fortran
      call pk_ledge (ledge,nledge,nsfm1,nrx_vs1,pk,npk,nwin1,nwin2)
      call ledge_taug (taug,ntaug,nssg,ledge,nledge)
c
      do itaug = 1, ntaug
         dtau = 0.25
         call copy1_r (taug, taug_tp, ntaug)
         do idtau = 1, 4
c search down to 1/16 of ts
            dtau = dtau / 2.
            taug_tp(itaug) = taug(itaug) + dtau
            call sgg_def (sfm,nsfm1,nsfm2,ldsfm, nssg, taug_tp,ntaug,
     &                    sfd,nsfd,nsfd1,nssfd)
            call lsf_no_dc (a_ls_tp,na_ls,sfm,910,nsfm1,nsfm2,
     &                      rx_vs, nrx_vs1, cond_tp, error_tp)
            n_search = n_search + 1
            write (6,4) n_search, error_tp, cond_tp
            write (10,4) n_search, error_tp, cond_tp
            write (6,21) (i,taug_tp(i),a_ls_tp(i),i=1,ntaug)
            write (10,21) (i,taug_tp(i),a_ls_tp(i),i=1,ntaug)
 21         format ('  i = ',i5,'  taug(i) = ',g11.4e3,
     &              '  a_ls(i) = (',g11.4e3,' , ',g11.4e3,')')
c
            if (error_tp.lt.error) then
               taug (itaug) = taug_tp (itaug)
               error = error_tp
               cond = cond_tp
               call copy1 (a_ls_tp, a_ls, na_ls)
            else
               taug_tp(itaug) = taug(itaug) - dtau
               call sgg_def (sfm,nsfm1,nsfm2,ldsfm, nssg,
     &                       taug_tp,ntaug,sfd,nsfd,nsfd1,nssfd)
               call lsf_no_dc (a_ls_tp,na_ls,sfm,910,nsfm1,nsfm2,
     &                         rx_vs, nrx_vs1, cond_tp, error_tp)
               n_search = n_search + 1
               write (6,4) n_search, error_tp, cond_tp
               write (10,4) n_search, error_tp, cond_tp
               write (6,21) (i,taug_tp(i),a_ls_tp(i),i=1,ntaug)
               write (10,21) (i,taug_tp(i),a_ls_tp(i),i=1,ntaug)
c
               if (error_tp.lt.error) then
                  taug (itaug) = taug_tp (itaug)
                  error = error_tp
                  cond = cond_tp
                  call copy1 (a_ls_tp, a_ls, na_ls)
               endif
            endif
         enddo
      enddo
c
      call sgg_def (sfm,nsfm1,nsfm2,ldsfm, nssg,
     &              taug,ntaug,sfd,nsfd,nsfd1,nssfd)
      call dc_lsf (d, a_ls, sfm,910,nsfm1,nsfm2, rx_vs, nrx_vs1)
c
      write (6,6)
      write (10,6)
 6    format (//,' ---------------------------------------------------',/,
     &           ' *****   minimun least-square-search result   *****',/)
      write (6,4) n_search, error, cond
      write (10,4) n_search, error, cond
      write (6,22) (i,pk(i),taug(i),a_ls(i),i=1,npk)
      write (10,22) (i,pk(i),taug(i),a_ls(i),i=1,npk)
 22   format ('  i = ',i5,'  pk(i) = ',i5,'  taug(i) =',g11.4e3,
     &        '  a_ls(i) = (',g11.4e3,' , ',g11.4e3,')')
```

```
c
c
c calculate filter parameters
      call taug_a_hxy_4 (hx,kx,kkx,hy,ky,kky,taug,a_ls,npk)
c
      write (6,9)
      write (10,9)
 9    format (//,' ---- the deghosting processor -----')
      write (6,7) d
      write (10,7) d
 7    format (' dc offset         d = ( ',g11.4e3,' , ',g11.4e3,' )'.)
      write (6,8) hx(1)
      write (10,8) hx(1)
 8    format (' amp-ph ajust   hx(1) = ( ',g11.4e3,' , ',g11.4e3,' )')
      write (6,11) (i,ky(i),hy(i),i=1,kky)
      write (10,11) (i,ky(i),hy(i),i=1,kky)
 11   format ('   i = ',i5,'  ky(i) = ',i5,
     &        '  hy(i) = ( ',g11.4e3,' , ',g11.4e3,' )')
c
c deghosting ( 4 fields of video data)
c no of overflow/underflow, real part only
      n_ovfl = 0
      n_udfl = 0
      do iline = 1, 1050
        if (mod(iline,10).eq.0) print *,'--- processing line ',iline
        do ipixel = 1,910
          x = cmplx(float(rx_r(ipixel,iline)),float(rx_i(ipixel,iline)))
     &        - d
          call d_filter (x,y, hx,kx,kkx, hy,ky,kky, sb)
          rx_r_dg (ipixel,iline) = int(real(y))
          rx_i_dg (ipixel,iline) = int(aimag(y))
          if (rx_r_dg(ipixel,iline).gt.255) then
            n_ovfl = n_ovfl + 1
            rx_r_dg(ipixel,iline) = 255
          elseif (rx_r_dg(ipixel,iline).lt.0) then
            n_udfl = n_udfl + 1
            rx_r_dg(ipixel,iline) = 0
          endif
        enddo
      enddo
c
c ouput result summary
c
      write (6,12) n_ovfl, n_udfl
      write (10,12) n_ovfl, n_udfl
 12   format (/,' --- # of overflow(255)/underflow(0) in real part ---',
     &        /,' n_ovfl = ',i8,'   n_udfl = ',i8)
      close(10)
c
c writing deghosted results
      print *,'------- writing deghosted results -------'
      call writeit (3,4,0,rx_r_dg)
      do i = 1,5
        type *,char(7)
      enddo
c
c show wavefroms of vertical sync(nl_vs) and active video (nl_av) selecte
c before and after deghosting, store comparison in file 11
      write (11,13) nl_vs
 13   format (' ******  vertical sync ******   line ',i5,/,
     &'    ipx     real in----imag in        real out---imag out')
      do i = 1,910
        write (11,14) i, rx_r(i,nl_vs),rx_i(i,nl_vs),
     &                   rx_r_dg(i,nl_vs),rx_i_dg(i,nl_vs)
      enddo
```

```
 14    format (1x,i5,5x,i8,3x,i8,7x,i8,3x,i8)
       write (11,15)
 15    format (//,'**** active video *****   nl_av =',
     &                i5,'npx_av_bg =',i5,/,
     &'    ipx       real in----imag in        real out---imag out')
       do i = 1,910
          ipx = i + npx_av_bg - 1
          write (11,14) ipx, rx_r(ipx,nl_av),rx_i(ipx,nl_av),
     &                  rx_r_dg(ipx,nl_av),rx_i_dg(ipx,nl_av)
       enddo
       close(11)
c
       call initt (240)
       call waveform (rx_r,rx_i, nl_vs, 1, 910, 50, 450, 150)
       call waveform (rx_r_dg,rx_i_dg, nl_vs,1,910, 50,100, 150)
       call pause
c
       call initt (240)
       call waveform (rx_r,rx_i, nl_av, npx_av_bg,910, 50,100,300)
       call pause
       call initt (240)
       call waveform (rx_r_dg,rx_i_dg, nl_av, npx_av_bg,910, 50,100,300)
       call pause
c
       call dvfexit
       stop
       end
c
c
c
c ******************************************************************
c
       subroutine taug_a_hxy_4 (hx,kx,kkx,hy,ky,kky,taug,a_ls,ntaug)
c
c ******************************************************************
c
c generate compensation filter coefficients and delay
c  from identified channel characteristic
c
c  for 2 paths trial routine
c
c cf: lpd for notation
c     4 taps for relative delay which is not integer times of
c     sampling interval
c
       complex hx(1), hy(1), a_ls(1)
       real taug(1)
       integer kx(1), kkx, ky(1), kky
c
       complex b(4)
       real err_lpd, dtau2
c
       external ro_flat
c
       if (ntaug.gt.2) then
          print *,'***** too many paths for current implementation ****'
          stop
       endif
c
       kkx = 1
       kx(1) = 0
       hx(1) = 1./a_ls(1)
```

```
c
      ts = 0.25
      kky = 0
      if (ntaug.ge.2) then
        ky_tp = int( (taug(2)-taug(1)) /ts )
        dtau2 = taug(2) - taug(1) - ts * ky_tp
        if (dtau2.lt.10.e-3) then
c smallest step is 0.015625
          ky(1) = ky_tp
          hy(1) = a_ls(2) / a_ls(1)
          kky = 1
        else
          dtau2 = dtau2 + ts
          call lpd (b,4,err_lpd,dtau2,ts,ro_flat,1.15)
          ky(1) = ky_tp - 1
          hy(1) = a_ls(2) * b(1) / a_ls(1)
          ky(2) = ky_tp
          hy(2) = a_ls(2) * b(2) / a_ls(1)
          ky(3) = ky_tp + 1
          hy(3) = a_ls(2) * b(3) / a_ls(1)
          ky(4) = ky_tp + 2
          hy(4) = a_ls(2) * b(4) / a_ls(1)
          kky = 4
        endif
      endif
c
      return
      end
c
c
c
c fd.for (filter_design)
c
c design deghosting filter
c
c ----------------  data definitions  ------------------
c
c 1. reference vector and its related data
c
c    sf (s_reference), nsf (n_s_reference)
c    sfp (s_ref_prime), nsfp (n_s_ref_prime)
c    rsfp (ro_s_ref_prime)
c    cosfp (covar_s_ref_prime)  ncosfp (n_covar_s_ref_prime)
c      (colume scanning matrix)
c
c 2. transformation matrix
c
c    am (a_matrix)w,  nam (n_a_matrix)
c       (use only none zero entry in row of the whole am)
c
c 3. observation data
c
c    rx (received_vector),  nrx (n_rec_vector)
c    rxp (received+_vector_prime),  nrxp
c
c 4. match filter thresholding
c
c    rxpm (rec_vector_prime_matched), nrxpm (n_rec_vector_prime_matched)
c    th1 (threshold_1)
c    drxpm (detected_rec_prime_matched),
c    ndrxpm (n_detected_rec_prime_matched)
c    bkr (block_range), nbkr (n_block_range)
c
```

```
c 5. least square fit 1
c
c    bls1 (b_ls_1), nbls1 (n_b_ls_1)
c    thls1 (threshold_ls_1), dls1 (detected_ls_1)
c    tpls (tp_ls, ntpls (n_tp_ls)
c       (use bkr, then generate new bkr from thresholding bls1)
c
c 6. least square fit 2
c
c    bls2 (b_ls_2), nbls2 (n_b_ls_2)
c    thls2 (threshold_ls_1), dls2 (detected_ls_2)
c       (use bkr)
c
c
c subroutines
c
c ****************************************************************
c
      subroutine sfdef (sf, nsf, nsf1)
c
c ****************************************************************
c
c sfdef (s_ref_defined): define reference vector
c
c sf - s reference vector
c nsf - no. of "none zero" entries in sf
c
      complex sf(1)
      integer nsf, nsf1
c
c some intermidiate signal referred
c (not yet implemented)
c
      nsf = 9
      nsf1 = 5
      sf(1) = cmplx( -1.8649517, -3.6012861)
      sf(2) = cmplx( -1.2861736, -5.6591640)
      sf(3) = cmplx( -0.77170418, -11.897106)
      sf(4) = cmplx( -6.4951768, -20.482315)
      sf(5) = cmplx( -19.099679, -25.241158)
      sf(6) = cmplx( -32.411575, -20.739549)
      sf(7) = cmplx( -39.163987, -11.189711)
      sf(8) = cmplx( -39.742765, -5.1125401)
      sf(9) = cmplx( -38.906753, -3.0546624)
c
      return
      end
c
c
c
c ****************************************************************
c
      subroutine amdef (am, nam, iam)
c
c ****************************************************************
c
c am (fir) definition
c
c am (a_matrix) - the "none zero" part of a vector of a_matrix
c nam (n_a_matrix) - no. of "none zero" am
c iam (i_a_matrix) - selection of different am
c
      complex am(1)
      integer nam, iam
```

```fortran
c
      if (iam.eq.1) then
        am(1) = -1.
        am(2) = 1.
        nam = 2
      elseif (iam.eq.2) then
        am(1) = -0.5
        am(2) = 1.
        am(3) = -0.5
        nam = 3
      else
        print *,'enter nam ?'
        read (5,*) nam
        print *,'enter am(nam) ?'
        read (5,*) (am(i), i=1,nam)
      endif
c
      return
      end
c
c
c
c *****************************************************************
c
      subroutine amtfm (x, nx,  am, nam,  xp, nxp)
c
c *****************************************************************
c
c amtfm (a_matrix_transform) to x, and generate xp
c
c x - input vector
c nx - dimension of x
c am - a_matrix vector
c nam - n_a_matrix no. of none zero a_matrix_vector
c xp - x_prime transformed x
c nxp - n_x_prime
c
      complex x(1), am(1), xp(1)
      integer nx, nam, nxp
c
      nxp = nx - nam + 1
      do i = 1, nxp
        xp(i) = 0.
        do j = 1,nam
          xp(i) = xp(i) + am(j)*x(i+j-1)
        enddo
      enddo
c
      return
      end
c
c
c
c *****************************************************************
c
      subroutine thd_norm (x, nx, th, lx, nlx)
c
c *****************************************************************
c
c thresholding the norm of x, put detected location in lx
c if (x(i)*conjg(x(i)) > th, lx(k) = i
c x - input vector
c nx - dimension of x
```

```
c th - threshold
c lx - detected x locations
c nlx - no of locations detected
c
      complex x(1)
      integer nx, lx(1), nlx
      real th
c
      nlx = 0
      do i = 1, nx
        if (cabs(x(i)).gt.th) then
          nlx = nlx + 1
          lx(nlx) = i
        endif
      enddo
c
      return
      end
c
c
c
c *****************************************************************
c
      subroutine bkrfd (bkr, nbkr, lx, nlx, nsfp)
c
c *****************************************************************
c
c bkrfd (block_range_finder)
c find blocks from detected position
c if lx(i)-lx(j) < nam, everything in between lx(i) and lx(j)
c    belong to the same block
c note: if least-square-fit does not consider rxpm that not in lx
c       it should use rxpm and lx, directly.
c
c bkr (block_range) - integer array contains block boundaries
c                     in two consecutive elements
c nbkr (n_block_range) - no. of blocks
c lx (location_x) - detected locations
c nlx (n_location_x) - no of locations detected
c nsfp (n_s_ref_prime) - minimum separation range to be isolated
c
      integer bkr(1), nbkr, lx(1), nlx, nsfp
c
      integer itp
c
      nbkr = 1
      itp = lx(1)
      if (nlx.ge.2) then
        do i = 2, nlx
          if ((lx(i)-itp).ge.nsfp) then
            bkr(nbkr*2-1) = itp
            bkr(nbkr*2) = lx(i-1)
            itp = lx(i)
            nbkr = nbkr + 1
          endif
        enddo
      endif
c
      bkr(nbkr*2-1) = itp
      bkr(nbkr*2) = lx(nlx)
c
      return
      end
```

```
c
c
c
c***************************************************************
c
      subroutine lsf1(bls,lbls,nbls, rxpm, bkr,nbkr, rsfp,nrsfp)
c
c***************************************************************
c
c lsf1 (lease_square_fit_1)
c
c bls (b_least_square) - calculated least square coefficients
c lbls (location_b_least_square)
c nbls (n_b_least_square) - dimension of caluculated coefficients
c rxpm (rec_vector_prime_matched)
c bkr (block_range)
c nbkr (n_block_range)
c rsfp (ro_s_ref_prime) _ autocorrelation function of s_reference prime
c nrsfp (n_ro_s_ref_prime)
c
      complex bls(1), rxpm(1)
      integer nbls, lbls(1), bkr(1), nbkr
      complex rsfp(1)
      integer nrsfp
c
c covariance matrix storage (note: an assembly language implementation
c  should use rsfp and some small temporary storage)
      complex covtp(625)
c
      nbls = 0
      do i = 1,nbkr
        nbk = bkr(i*2) - bkr(i*2-1) + 1
        if (nbk.eq.1) then
          nbls = nbls + 1
          lbls(nbls) = bkr(i*2)
          bls(nbls) = rxpm(bkr(i*2))/rsfp(1)
        else
          do j1 = 1, nbk
            do j2 = 1,nbk
              if (iabs(j1-j2).ge.nsfp) then
                covtp(j1+(j2-1)*nbk) = 0.
              elseif (j1.ge.j2) then
                covtp(j1+(j2-1)*nbk) = rsfp(j1-j2+1)
              else
                covtp(j1+(j2-1)*nbk) = conjg(rsfp(j2-j1+1))
              endif
            enddo
          enddo
c should be replaced by routines that use condition no. criterion
          call miv1 (covtp, nbk, covtp, dtp)
          do j1 = 1,nbk
            bls(nnls+j1) = 0.
            lbls(nbls+j1) = bkr(i*2-1) + j1 - 1
            do j2 = 1,nbk
              bls(nbls+j1) = bls(nbls+j1)
     &              + covtp(j1+(j2-1)*nbk)*rxpm(bkr(i*2-1)+j2-1)
            enddo
          enddo
          nbls = nbls + nbk
        endif
      enddo
c
      return
      end
```

```
c
c
c
c **********************************************************************
c
      subroutine thrhd1 (x, lx, nx, th, dlx, ndlx)
c
c **********************************************************************
c
c thresholding x, put detected location in lx
c if conjg(x(i))*(x(i)) > th, dlx(k) = lx(i)
c x - input vector
c lx (location_x)
c nx - dimension of x, lx
c th - threshold
c dlx (detected_location_x) - detected x locations
c nlx - no of locations detected
c
      complex x(1)
      integer lx(1), nx, dlx(1), ndlx
      real th
c
      ndlx = 0
      do i = 1, nx
        if (real(conjg(x(i))*x(i)).gt.th) then
          ndlx = ndlx + 1
          dlx(ndlx) = lx(i)
        endif
      enddo
c
      return
      end
c
c
c
c **********************************************************************
c
      subroutine fchdef(fch, ich)
c
c **********************************************************************
c
c fchdef (freq_channel_definition)
c        (normalized w.r.t. color subcarrier)
c
c fch (freq_channel)
c ich (i_channel) - channel no
c
      real fch
      integer ich
c
      if (ich.eq.1) then
        fch = 0.
      else
        fch = (43.25 + i*6)/3.579545
      endif
c
      return
      end
c
c
c
c **********************************************************************
c
      subroutine rxp_match_sfp (rxpm, nrxpm, rxp, nrxp, sfp, nsfp)
```

```
c
c ********************************************************************
c
c rxp_match_sfp to generate rxpm (received_x_prime_matched)
c
c rxpm (received_x_prime_matched)
c nrxpm (n_received_x_prime_matched)
c
c rxp (received_x_prime)
c nrxp (n_received_x_prime)
c
c sfp (s_ref_prime)
c nsfp (n_ref_prime)
c
      complex rxpm(1), rxp(1), sfp(1)
      integer nrxpm, nrxp, nsfp
c
      nrxpm = nrxp - nsfp + 1
c
      do i = 1, nrxpm
        rxpm(i) = 0.
        do j = 1, nsfp
          rxpm(i) = rxpm(i) + rxp(i+j-1)*sfp(j)
        enddo
      enddo
c
      return
      end
c
c
c
c ********************************************************************
c
      subroutine rxdef (rx, nrx, fn)
c
c ********************************************************************
c
c rxdef (received_vector_definition)
c read in rx from file fn
c file format of rxdef.dat
c
c file_name
c nrx
c 1st data
c 2nd data
c .
c .
c nrx-th data
c
c rx (recieved_vector)
c nrx (n_recieved_vector)
c
      character*20 fn
      complex rx(1)
      integer nrx
c
      open (4,file=fn,status='old')
c
      read (4,*)
      read (4,*) nrx
c
      do i = 1, nrx
        read (4,*) xr, xi
        rx(i) = cmplx(xr,xi)
      enddo
```

```
c
      close(4)
c
      return
      end
c
c
c
c **************************************************************
c
      subroutine plot_vector (px, py, np)
c
c **************************************************************
c
c plot (px, py) integer number pairs
c
c px (plot_x) array
c py (plot_y) array
c np (n_plot)
c
      integer px(1), py(1)
      integer np
c
      call movabs(px(1),py(1))
      do i = 2, np
         call drwabs(px(i),py(i))
      enddo
c
      return
      END
c
c
c
c **************************************************************
c
      subroutine vt_plt_abs_c (vt, nvt, ixoff, iyoff)
c
c **************************************************************
c
c plot abs value of complex vector vt with (ixoff,iyoff) offset
c by using plot10 routines
c
c vt - vector
c nvt - dimension of vector to be plotted
c ixoff - ix_off_set
c iyoff - iy_off_set
c
      complex vt(1)
      integer nvt, ixoff, iyoff
c
      integer ix, iy
c
      ix = ixoff + 1
      iy = iyoff + int(cabs(vt(1)))
      call movabs( ix,iy)
      call pntabs (ix,iy)
c
      if (nvt.ge.2) then
         do i = 2, nvt
            ix = ixoff + i
            iy = iyoff + int(cabs(vt(i)))
            call drwabs (ix, iy)
         enddo
      endif
```

```
c       return
        end
c
c
c
c *************************************************************
c
        subroutine vt_plt_c (vt, nvt, ixoff, iyoff)
c
c *************************************************************
c
c plot complex vector vt with (ixoff,iyoff) offset
c by using plot10 routines
c
c vt - vector
c nvt - dimension of vector to be plotted
c ixoff - ix_off_set
c iyoff - iy_off_set
c
        complex vt(1)
        integer nvt, ixoff, iyoff
c
        integer ix, iy
c
        ix = ixoff + 1
        iy = iyoff + int(real(vt(1)))
        print *,' 1',ix,iy
        call movabs (ix,iy)
        call pntabs (ix,iy)
c
        if (nvt.ge.2) then
           do i = 2, nvt
              ix = ixoff + i
              iy = iyoff + int(real(vt(i)))
              call drwabs (ix, iy)
           enddo
        endif
c
        ix = ixoff + 1
        iy = iyoff + int(aimag(vt(1)))
        call movabs( ix,iy)
        call pntabs (ix,iy)
c
        if (nvt.ge.2) then
           do i = 2, nvt
              ix = ixoff + i
              iy = iyoff + int(aimag(vt(i)))
              call drwabs (ix, iy)
           enddo
        endif
c
        return
        end
c
c
c
c *************************************************************
c
        subroutine scrn_read (ix, iy, ixoff, iyoff)
c
```

```
c *************************************************************
c
c read screen coordinate from plot on the screen by using plot10 routines
c where (ixoff,iyoff) is screen plot offset
c
c ix, iy - coordinate returned
c ixoff - ix_off_set
c iyoff - iy_off_set
c
      integer ix, iy
      integer ixoff, iyoff
c
 200  call scursr (ichar, ix, iy)
      call movabs(ixoff,700)
      call anmode
      ix = ix - ixoff
      iy = iy - iyoff
      write (6,*) ix, iy
      print *,'read another coordinate, 1/0 ?'
      read (5,*) ians
      if (ians.ne.0) goto 200
c
      return
      end
c
c
c
c *************************************************************
c
      subroutine scrn_thd (th, ixoff, iyoff)
c
c *************************************************************
c
c find threshold from plot on the screen by using plot10 routines
c where (ixoff,iyoff) is screen plot offset
c
c th - threshold
c ixoff - ix_off_set
c iyoff - iy_off_set
c
      real th
      integer ixoff, iyoff
c
      integer ix, iy
c
 200  call scursr (ichar, ix, iy)
      call movabs(ixoff,700)
      call anmode
      write (6,*) ix-ixoff, iy-iyoff
      print *,'change threshold, 1/0 ?'
      read (5,*) ians
      if (ians.ne.0) goto 200
      th = float(iy-iyoff)
c
      return
      end
c
c
c
c *************************************************************
c
      subroutine sf_mat1 (sfm,nsfm1,nsfm2,ledge,nledge,sf,nsf,nsf1)
```

```
c
c *******************************************************************
c generate sf_matrix from sf and edge locations
c
c sfm (s_ref_mat)
c nsfm1, nsfm2 (dimension of sfm)
c     nsfm1 - 1st dimension of sfm, length of each edge info
c     nsfm2 - 2nd dimension of sfm, no. of edges
c ledge() (edge locations)
c nledge (n_edges)
c sf() - s_ref
c nsf - n_s_ref
c nsf1 - n_s_ref (edge location in sf)
c
      complex sfm(1), sf(1)
      integer nsfm1, nsfm2, ledge(1), nledge, nsf
c
      nsfm2 = nledge
      do i = 1,nledge
        ntau = ledge(i)
        if ((ntau.le.nsf1).and.(nsfm1.le.(nsf-nsf1+ntau))) then
           do j = 1, nsfm1
              sfm(j+(i-1)*nsfm1) = sf(j+nsf1-ntau)
           enddo
        elseif ((ntau.le.nsf1).and.(nsfm1.gt.(nsf-nsf1+ntau))) then
           do j = 1, (nsf-nsf1+ntau)
              sfm(j+(i-1)*nsfm1) = sf(j+nsf1-ntau)
           enddo
           do j = (nsf-nsf1+ntau+1), nsfm1
              sfm(j+(i-1)*nsfm1) = sf(nsf)
           enddo
        elseif ((ntau.gt.nsf1).and.(nsfm1.le.(nsf-nsf1+ntau))) then
           do j = 1, (ntau-nsf1)
              sfm(j+(i-1)*nsfm1) = sf(1)
           enddo
           do j = (ntau-nsf1+1), nsfm1
              sfm(j+(i-1)*nsfm1) = sf(j-ntau+nsf1)
           enddo
        elseif ((ntau.gt.nsf1).and.(nsfm1.gt.(nsf-nsf1+ntau))) then
           do j = 1, (ntau-nsf1)
              sfm(j+(i-1)*nsfm1) = sf(1)
           enddo
           do j = (ntau-nsf1+1), (nsf+ntau-nsf1)
              sfm(j+(i-1)*nsfm1) = sf(j-ntau+nsf1)
           enddo
           do j = (nsf+ntau-nsf1+1), nsfm1
              sfm(j+(i-1)*nsfm1) = sf(nsf)
           enddo
        endif
      enddo
c
      return
      end
c
c
c
c *******************************************************************
c
      subroutine sf_mat (sfm,nsfm1,nsfm2,ldsfm,ledge,nledge,sf,nsf,nsf1)
c
c *******************************************************************
c generate sf_matrix from sf and edge locations
c
```

```
c sfm (s_ref_mat)
c nsfm1, nsfm2 (dimension of sfm)
c    nsfm1 - 1st dimension of sfm, length of each edge info
c    nsfm2 - 2nd dimension of sfm, no. of edges
c ldsfm - leading dimension of sfm matrix storage
c ledge() (edge locations)
c nledge (n_edges)
c sf() - s_ref
c nsf - n_s_ref
c nsf1 - n_s_ref (edge location in sf)
c
      complex sfm(ldsfm,1), sf(1)
      integer nsfm1, nsfm2, ledge(1), nledge, nsf
c
      nsfm2 = nledge
      do i = 1,nledge
        ntau = ledge(i)
        if ((ntau.le.nsf1).and.(nsfm1.le.(nsf-nsf1+ntau))) then
          do j = 1, nsfm1
            sfm(j,i) = sf(j+nsf1-ntau)
          enddo
        elseif ((ntau.le.nsf1).and.(nsfm1.gt.(nsf-nsf1+ntau))) then
          do j = 1, (nsf-nsf1+ntau)
            sfm(j,i) = sf(j+nsf1-ntau)
          enddo
          do j = (nsf-nsf1+ntau+1), nsfm1
            sfm(j,i) = sf(nsf)
          enddo
        elseif ((ntau.gt.nsf1).and.(nsfm1.le.(nsf-nsf1+ntau))) then
          do j = 1, (ntau-nsf1)
            sfm(j,i) = sf(1)
          enddo
          do j = (ntau-nsf1+1), nsfm1
            sfm(j,i) = sf(j-ntau+nsf1)
          enddo
        elseif ((ntau.gt.nsf1).and.(nsfm1.gt.(nsf-nsf1+ntau))) then
          do j = 1, (ntau-nsf1)
            sfm(j,i) = sf(1)
          enddo
          do j = (ntau-nsf1+1), (nsf+ntau-nsf1)
            sfm(j,i) = sf(j-ntau+nsf1)
          enddo
          do j = (nsf+ntau-nsf1+1), nsfm1
            sfm(j,i) = sf(nsf)
          enddo
        endif
      enddo
c
      return
      end
c
c
c
c****************************************************************
c
      subroutine no_dc (x,ldx,nx1,nx2)
c
c****************************************************************
c
c eliminate dc offset in each column of x
c
c x() - input (nx1,nx2) matrix with leading storage dimension ldx
c ldx - leading storage dimension of x
```

```
c nx1, nx2 - dimension of data in x
c
      complex x(ldx,1)
      integer nx1, nx2
c
      complex dc_tp
c
      do i = 1, nx2
        dc_tp = 0.
        do j = 1, nx1
          dc_tp = dc_tp + x(j,i)
        enddo
        dc_tp = dc_tp/float(nx1) .
        do j = 1, nx1
          x(j,i) = x(j,i) - dc_tp
        enddo
      enddo
c
      return
      end
c
c
c
c **************************************************************
c
      subroutine vt_plt_abs_c1 (vt, nvt, lvt, ixoff, iyoff)
c
c **************************************************************
c
c plot abs value of complex vector vt with (ixoff,iyoff) offset
c by using plot10 routines
c
c vt() - vector
c nvt - dimension of vector to be plotted
c lvt() - location of vt() component
c ixoff - ix_off_set
c iyoff - iy_off_set
c
      complex vt(1)
      integer nvt, ixoff, iyoff, lvt(1)
c
      integer ix, iy
c
      do i = 1, nvt
        ix = lvt(i) + ixoff
        iy = iyoff
        call movabs (ix,iy)
        call pntabs (ix,iy)
        ix = lvt(i) + ixoff
        iy = iyoff + int(vt(i)*conjg(vt(i)))
        call drwabs (ix, iy)
      enddo
c
      return
      end
c
c
c
c ******************************************************************
c
    subroutine peak_search (pk,npk,p_sep,lrxpm,nlrxpm,rxpm,nrxpm,nsf1)
c
c ******************************************************************
```

```
c
c searxh peak in abs(rxpm()) for locations located by lrxpm()
c when   separation (lrxpm(i)-lrxpm(i-1) >= (p_sep),
c          separate peak should be considered
c
c pk() - peak location located
c npk - number of peaks
c p_sep - min. separation between skirts of peak consideration
c lrxpm() - location_rx_prime_matched where abs(rxpm()) > threshold
c nlrxpm - number of locations in lrxpm()
c rxpm() - r_vaector_prime_matched
c nrxpm - data dimension of rxpm
c
      integer pk(1), npk, p_sep, lrxpm(1), nlrxpm, nrxpm
      complex rxpm(1)
c
      integer pk_tp
c
      npk = 0
      pk_tp = lrxpm(1)
      do i = 2, nlrxpm
        if ((lrxpm(i)-lrxpm(i-1)).ge.p_sep) then
          npk = npk + 1
          pk(npk) = pk_tp
          pk_tp = lrxpm(i)
        elseif (cabs(rxpm(lrxpm(i))).gt.cabs(rxpm(pk_tp))) then
          pk_tp = lrxpm(i)
        endif
      enddo
      npk = npk + 1
      pk(npk) = pk_tp
c
c translate peak locations to the locations in rx()
      do i = 1, npk
        pk(i) = pk(i) + nsf1 - 1
      enddo
c
      return
      end
c
c
c
c *****************************************************************
c
      subroutine lsf_no_dc (a_ls, na_ls, sfm, ldsfm, nsfm1, nsfm2,
     &                     rx, nrx1, cond, error)
c
c *****************************************************************
c
c find least square solution a_ls of rx = sfm * a
c
c a_ls() - least square solution
c na_ls - dimension of solution in a_ls vector
c sfm() - reference signal matrix
c ldsfm - leading dimension of sfm storage
c nsfm1, nsfm2 - 1st and 2nd dimension of data in sfm
c rx() - observed data
c nrx1 - starting position of data in rx for the least square fit
c cond - condition number from csvdc routine,
c         if cond = 0,( info =/ 0 ), ill conditioned.
c error - norm square of the error vector of least square fit
c
c 1: eliminate dc in sfm and rx
```

```
c 2: sfm = u * sv * v'
c 3: a_ls = v * sv(-1) * u' * rx_tp
c 4: error = norm( (I - U1*U1') * rx_tp )
      complex a_ls(1), sfm(ldsfm,1), rx(1)
      integer na_ls, ldsfm, nsfm1, nsfm2, nrx1
      real cond, error
c
c note: nsfm2 < 50, nsfm1 < 100
      complex v_tp(50,50), work(910), sv(100), e(100),  rx_tp(910,1)
      integer ldv_tp, job, info
      complex ctp
c
      ldv_tp = 50
      job = 22
c
      call no_dc (sfm, ldsfm, nsfm1, nsfm2)
      do i = 1, nsfm1
         rx_tp(i,1) = rx(i+nrx1-1)
      enddo
      call no_dc (rx_tp,100,nsfm1,1)
c
      call csvdc (sfm,ldsfm,nsfm1,nsfm2, sv, e, sfm,ldsfm,
     &            v_tp, ldv_tp, work, job, info)
c
      if (info.ne.0) then
        print *,'ill conditioned sfm'
        cond = 0.
      else
        cond = cabs(sv(1))/cabs(sv(nsfm2))
      endif
c note: when info.ne.0, the main program should be informed.
c
      do j = 1,nsfm2
        work(j) = 0.
        do k = 1, nsfm1
           work(j) = work(j) + conjg(sfm(k,j))*rx_tp(k,1)
        enddo
      enddo
c
      na_ls = nsfm2
      do i = 1, na_ls
        a_ls(i) = 0.
        do j = 1, nsfm2
           a_ls(i) = a_ls(i) + v_tp(i,j) * work(j) / sv(j)
        enddo
      enddo
c
c calculate norm square of error
      do i = 1, nsfm2
        work(i) = 0.
        do j = 1, nsfm1
           work(i) = work(i) + conjg(sfm(j,i))*rx_tp(j,1)
        enddo
      enddo
c
      error = 0.
      do i = 1, nsfm1
        ctp = 0.
        do j = 1, nsfm2
           ctp = ctp + sfm(i,j)*work(j)
        enddo
        ctp = rx_tp(i,1) - ctp
        error = error + cabs(ctp*conjg(ctp))
      enddo
```

```
c        return
         end
c
c
c
c ************************************************************
c
         subroutine vt_plt_2 (v1, v2, nv, ix1, iy1, iy2, idy)
c
c ************************************************************
c
c plot 2 vectors using plot10 routines
c
c v1() - real vector 1
c v2() - real vector 2
c nv - number of elements to be plotted in each vector
c ix1 - x-axis origin
c iy1 - y-axis origin for vector v1()
c iy2 - y-axis origin for vector v2()
c idy - max amp mapping on y axis from either vector
c
c
         real v1(1), v2(1)
         integer nv, ix1, iy1, iy2, idy
c
         amx_r = v1(1)
         amn_r = v1(1)
         amx_i = v2(1)
         amn_i = v2(1)
         do i = 2, 910
            if (v1(i).gt.amx_r) then
               amx_r = v1(i)
            elseif (v1(i).lt.amn_r) then
               amn_r = v1(i)
            endif
c
            if (v2(i).gt.amx_i) then
               amx_i = v2(i)
            elseif (v2(i).lt.amn_i) then
               amn_i = v2(i)
            endif
         enddo
         adif_r = amx_r-amn_r
         adif_i = amx_i-amn_i
         adif = amax1(adif_r,adif_i)
c
         ix = ix1
         iy = iy1 + int(idy*(v1(1)-amn_r)/adif)
         call movabs(ix,iy)
         do i = 2, 910
           ix = i - 1 + ix1
           iy = iy1 + int(idy*(v1(i)-amn_r)/adif)
           call drwabs(ix,iy)
         enddo
c
         ix = 10
         iy = iy2 + int(idy*(v2(1)-amn_i)/adif)
         call movabs(ix,iy)
         do i = 2, 910
           ix = i - 1 + ix1
           iy = iy2 + int(idy*(v2(i)-amn_i)/adif)
           call drwabs(ix,iy)
         enddo
```

```
c
      return
      end
c
c
c ***********************************************************
c
      subroutine vt_plt_cabs (v1, nv, ix1, iy1, idy)
c
c ***********************************************************
c
c plot magnitude of a complex vector using plot10 routines
c
c v1() - complex vector 1
c nv - number of elements to be plotted in each vector
c ix1 - x-axis origin
c iy1 - y-axis origin for vector v1()
c idy - max amp mapping on y axis
c
c
      complex v1(1)
      integer nv, ix1, iy1, idy
c
      amx_r = cabs(v1(1))
      amn_r = cabs(v1(1))
      do i = 2, 910
         if (cabs(v1(i)).gt.amx_r) then
            amx_r = cabs(v1(i))
            elseif (cabs(v1(i)).lt.amn_r) then
            amn_r = cabs(v1(i))
         endif
      enddo
      adif = amx_r-amn_r
c
      ix = ix1
      iy = iy1 + int(idy*(cabs(v1(1))-amn_r)/adif)
      call movabs(ix,iy)
      do i = 2, 910
        ix = i + ix1 -1
        iy = iy1 + int(idy*(cabs(v1(i))-amn_r)/adif)
        call drwabs(ix,iy)
      enddo
c
      return
      end
c
c
c
c ***********************************************************
c
      subroutine vt_plt_cabs1 (v1, nv, ix1, idx, iy1, idy)
c
c ***********************************************************
c
c plot magnitude of a complex vector using plot10 routines
c
c v1() - complex vector 1
c nv - number of elements to be plotted in each vector
c ix1 - x-axis origin
c idx - step on x-axis
c iy1 - y-axis origin for vector v1()
c idy - max amp mapping on y axis
c
```

```
c
      complex v1(1)
      integer nv, ix1, iy1, idy
c
      amx_r = cabs(v1(1))
      amn_r = cabs(v1(1))
      do i = 2, 910
         if (cabs(v1(i)).gt.amx_r) then
           amx_r = cabs(v1(i))
           elseif (cabs(v1(i)).lt.amn_r) then
             amn_r = cabs(v1(i))
           endif
      enddo
      adif = amx_r-amn_r
c
      ix = ix1
      iy = iy1 + int(idy*(cabs(v1(1))-amn_r)/adif)
      call movabs(ix,iy)
      do i = 2, 910
        ix = ix1 + (i-1)*idx
        iy = iy1 + int(idy*(cabs(v1(i))-amn_r)/adif)
        call drwabs(ix,iy)
      enddo
c
      return
      end
c
c
c
c***********************************************************************
c
      subroutine rxp_corl_sfp (rxpm, nrxpm, rxp, nrxp, sfp, nsfp)
c
c***********************************************************************
c
c rxp_corl_sfp to generate rxpm (received_x_prime_correlated)
c
c rxpm (received_x_prime_matched)
c nrxpm (n_received_x_prime_matched)
c
c rxp (received_x_prime)
c nrxp (n_received_x_prime)
c
c sfp (s_ref_prime)    (to be conjugated when correlating)
c nsfp (n_ref_prime)
c
      complex rxpm(1), rxp(1), sfp(1)
      integer nrxpm, nrxp, nsfp
c
      nrxpm = nrxp - nsfp + 1
c
      do i = 1, nrxpm
        rxpm(i) = 0.
        do j = 1, nsfp
          rxpm(i) = rxpm(i) + rxp(i+j-1)*conjg(sfp(j))
        enddo
      enddo
c
      return
      end
c
c
c
```

```
c sb50.for                                      4-28-86
c
c *************************************************************
c
      subroutine updbf( x, sb, kmx)
c
c *************************************************************
c
c update_buffer
c
c     x - input
c  sb(1) - buffer
c    kmx - buffer size
c
      complex x, sb(1)
      integer kmx
c
      if (kmx.eq.2) then
         sb(2) = sb(1)
      elseif (kmx.gt.2) then
      do i = kmx, 2, -1
         sb(i) = sb(i-1)
      enddo
      endif
      sb(1) = x
c
      return
      end
c
c
c
c
c *************************************************************
c
      subroutine d_filter (x,y, hx,kx,kkx, hy,ky,kky, sb)
c
c *************************************************************
c
c digital filter    (causal---min (kx(i) >= 0)
c                   (         min (ky(i) >= 1)
c
c       x - input
c       y - output
c   hx(1) - numerator multiplication coefficient
c   kx(1) - numerator corresponding delay
c     kkx - no of non-zero numeratocoefficient
c   hy(1) - denomenator multiplication coefficient
c   ky(1) - denomenator corresponding delay
c     kky - no of non-zero denomenator coefficient
c   sb(1) - state buffer
c
c
c         kkx                          kky
c  y[n] = S hx(i)*x[n-kx(i)]  -    S hy(j)*y[n-ky(j)]
c         i=1                         j=1
c
      complex x, y
      complex sb(1)
      complex hx(1), hy(1)
      integer kx(1), kkx, ky(1), kky
c
      complex tp
```

```
c
      tp = x
      if (kky.ge.1) then
         do j = 1, kky
            tp = tp - hy(j)*sb(ky(j))
         enddo
      endif
c
      if (kx(1).eq.0) then
         y = hx(1) * tp
      else
         y = hx(1) * sb(kx(1))
      endif
c
      if (kkx.gt.1) then
         do i = 2, kkx
            y = y + hx(i)*sb(kx(i))
         enddo
      endif
c
      call updbf(tp, sb, max(kx(kkx), ky(kky)))
c
      return
      end
c
c
c
c ****************************************************************
c
      subroutine pk_a_hxy (hx,kx,kkx, hy,ky,kky, pk, a_ls,npk)
c
c ****************************************************************
c
c calculate direct inverse digital filter hx(), hy()
c  from pk() and a_ls() directly
c
c --- on input ----
c pk() - peak locations in terms of positons in rx_vs()
c        (transfromed from abs(rxpm()) peaks back to rx_vs())
c a_ls() - least-square-fit solutions using windowed rx_vs()
c          and assuming edge locations pk()
c npk - no. of pk()
c
c --- on return ----
c hx() - numerators coefficients
c kx() - delay of hx()
c kkx - no. of coefficients in hx()
c hy() - denomenator coefficients
c ky() - delay of hy()
c kky - no. of coefficients in hy()
c
      complex hx(1), hy(1), a_ls(1)
      integer kx(1), kkx, ky(1), kky, pk(1), npk
c
      kkx = 1
      kx(1) = 0
      hx(1) = 1./a_ls(1)
      kky = 0
      if (npk.gt.1) then
         kky = npk - 1
         do i = 2, npk
            ky(i-1) = pk(i) - pk(1)
            hy(i-1) = a_ls(i)/a_ls(1)
         enddo
      endif
```

```fortran
c
      return
      end
c
c
c
c ****************************************************************
c
      subroutine waveform (jvt_r,jvt_i, nl_vt,npx_vt_bg,npx_plt,
     &                     ixoff, iyoff, iysep)
c
c ****************************************************************
c
c plot video waveform of line nl_vt of vt() started from npx_vt_bg
c    offset and npx_ob long on screen with (ixoff,iyoff) offset for
c    jvt_r(), (ixoff,iyoff+iysep) offset for jvt_i()
c    by using plot10 routines
c
c vt_r() - real part of video data
c vt_i() - iamg part of video data
c nl_vt - line to be plotted
c npx_vt_bg - begin of pixel in line nl_vt to be plotted
c npx_plt - no. of pixels to be plotted
c
c ixoff - ix_off_set
c iyoff - iy_off_set
c iysep - separation between two plots
c
      integer*2 jvt_r(910,1), jvt_i(910,1)
      integer nl_vt, npx_vt_bg, npx_plt
      integer ixoff, iyoff, iysep
c
      integer ix, iy
c
      ix = ixoff + 1
      iy = iyoff + iysep + jvt_r(npx_vt_bg,nl_vt)
      call movabs (ix,iy)
      call pntabs (ix,iy)
c
      if (npx_plt.ge.2) then
        do i = 2, npx_plt
          ix = ixoff + i
          iy = iyoff + iysep + jvt_r(npx_vt_bg+i-1,nl_vt)
          call drwabs (ix, iy)
        enddo
      endif
c
      ix = ixoff + 1
      iy = iyoff + jvt_i(npx_vt_bg,nl_vt)
      call movabs (ix,iy)
      call pntabs (ix,iy)
c
      if (npx_plt.ge.2) then
        do i = 2, npx_plt
          ix = ixoff + i
          iy = iyoff + jvt_i(npx_vt_bg+i-1,nl_vt)
          call drwabs (ix, iy)
        enddo
      endif
c
      return
      end
c ****************************************************************
```

```
c
      subroutine pk_ledge (ledge, nledge, nsfm1, nrx_vs1,
     &                     pk, npk, nwin1, nwin2)
c
c *****************************************************************
c
c calculate edge locations and related parameters from paek info.
c
c ---- on entry ----
c pk() - peak locations in rx_vx()
c npk - no. of peaks
c nwin1 - no. of pixels to the left of first peak (included)
c nwin2 - no. of pixels to the right of last peak (included)
c
c ---- on return ----
c ledge() - location of edges in observation vector (rx_vs_ob())
c nledge - no. of edges
c nsfm1 - no. of pixel in the observation window
c nrx_vs1 - the first pixel location of the observation window in rx_vs()
c
      integer ledge(1), nledge, nsfm1, nrx_vs1
      integer pk(1), npk, nwin1, nwin2
c
      nledge = npk
      do i = 1, nledge
         ledge(i) = nwin1 + pk(i) - pk(1)
      enddo
      nrx_vs1 = pk(1) - nwin1 + 1
      nsfm1 = nwin1 + pk(npk) - pk(1) + nwin2 - 1
c
      return
      end
c
c
c
c *********************************************************************
c
      subroutine thd_abs (x, nx, th, lx, nlx)
c
c *********************************************************************
c
c thresholding the abs of x(), put detected location in lx
c if abs(x(i)) > th, lx(k) = i
c x - input vector
c nx - dimension of x
c th - threshold
c lx - detected x locations
c nlx - no of locations detected
c
      complex x(1)
      integer nx, lx(1), nlx
      real th
c
      nlx = 0
      do i = 1, nx
         if (cabs(x(i)).gt.th) then
            nlx = nlx + 1
            lx(nlx) = i
         endif
      enddo
c
      return
      end
```

```
c
c
c
c****************************************************************
c
      subroutine pause
c
c****************************************************************
c
c use plot10 cursor quiry routine to hold the execution of program
c  screen display
c
      integer ix, iy
      integer ichar
c
      call scursr(ichar,ix,iy)
c
      return
      end
c
c
c
c****************************************************************
c
      subroutine dc_lsf (d, a_ls, sfm,ldsfm,nsfm1,nsfm2, rx,nrx1)
c
c****************************************************************
c
c find dc offset
c
c d() = rx() - sfm * a_ls()        cf: DSRC note 0 page 68-75
c        T
c d = 1() * d() / nsfm1
c
c a_ls() - least square solution
c na_ls  - dimension of solution in a_ls vector
c sfm()  - reference signal matrix
c ldsfm  - leading dimension of sfm storage
c nsfm1, nsfm2 - 1st and 2nd dimension of data in sfm
c rx()   - observed data
c nrx1   - starting position of data in rx for the least square fit
c
      complex d
      complex a_ls(1), sfm(ldsfm,1), rx(1)
      integer na_ls, ldsfm, nsfm1, nsfm2, nrx1
c
      d = 0.
      do j = 1,nsfm1
        d = d + rx(j+nrx1-1)
        do k = 1, nsfm2
          d = d - sfm(j,k) * a_ls(k)
        enddo
      enddo
c
      d = d / nsfm1
c
      return
      end
c
c
c
c****************************************************************
c
      subroutine sfdef1 (sf, nsf, nsf1, d2,d3)
```

```
c
c ***************************************************************
c
c sfdef (s_ref_defined): define reference vector
c
c sf - s reference vector
c nsf - no. of "none zero" entries in sf
c nsf - center of edge in sf()
c
c d2, d3 - range of composite video to be mapped onto
c          refer to note 0 page 68-75 for notation and derivation
c
      complex sf(1)
      integer nsf, nsf1
c
      real d2, d3
c
      real d6, d7, d8, d9, g
c
c some intermidiate signal referred
c (not yet implemented)
c
      nsf = 9
      nsf1 = 5
      sf(1) = cmplx( -1.8649517, -3.6012861)
      sf(2) = cmplx( -1.2861736, -5.6591640)
      sf(3) = cmplx( -0.77170418, -11.897106)
      sf(4) = cmplx( -6.4951768, -20.482315)
      sf(5) = cmplx( -19.099679, -25.241158)
      sf(6) = cmplx( -32.411575, -20.739549)
      sf(7) = cmplx( -39.163987, -11.189711)
      sf(8) = cmplx( -39.742765, -5.1125401)
      sf(9) = cmplx( -38.906753, -3.0546624)
c
      d6 = (40.*d3+100.*d2)/140.
      d7 = real(sf(1))
      d8 = d7
c
      do i = 2, nsf
        if (real(sf(i)).gt.d7) d7 = real(sf(i))
        if (real(sf(i)).lt.d8) d8 = real(sf(i))
      enddo
c
      d9 = (d2*d7 - d6*d8)/(d7-d8)
      g = 1.
      if (d7.ne.0.) then
        g = (d6-d9)/d7
      elseif (d8.ne.0.) then
        g = (d2-d9)/d8
      endif
c
      do i = 1, nsf
        sf(i) = g*sf(i) + d9*cmplx(1.,1.)
      enddo
c
      return
      end
c
c
c
c ***************************************************************
```

```
c
      subroutine sg_def (sg,nsg, taug, nssg, sfd, nsfd, nsfd1, nssfd)
c
c ****************************************************************
c
c generate a ghosting vertical sync reference from sfd()
c    with edge located at taug
c
c sg() - ghost vector
c nsg - n_sg
c taug - edge location of sg() in unit of 1/fc
c nssg - sampling rate in unit of fc
c sfd() - sf_detail()
c nsfd -n_sfd
c nsfd1 - edge location in sfd in unit of sample
c nssfd - n_sample_sfd in unit of fc
c
      complex sg(1), sfd(1)
      real taug
      integer nsg, nssg, nsfd, nsfd1, nssfd
c
      n_st = nsfd1 - nint (taug*float(nssfd))
c
      do i = 1, nsg
        j = n_st + (i-1) * nssfd / nssg
        if (j.lt.1) then
          sg(i) = sfd(1)
        elseif (j.gt.nsfd) then
          sg(i) = sfd (nsfd)
        else
          sg(i) = sfd(j)
        endif
      enddo
c
      return
      end
c
c
c
c ****************************************************************
c
      subroutine sfddef (sfd, nsfd, nsfd1, nssfd)
c
c ****************************************************************
c
c sfddef (s_ref_detail_defined): define reference vector
c
c sfd() - s reference vector
c nsfd - n_sfd
c nsdf1 - edge location in sfd()
c nssfd - sampling rate in unit of fc
c
      complex sfd(1)
      integer nsfd, nsfd1, nssfd
c
      complex vs(256)
c
      nsfd = 144
      nssfd = 64
c
      vs( 64) = cmplx (    -1.4791,     -3.1833 )
      vs( 65) = cmplx (    -1.5434,     -3.2476 )
      vs( 66) = cmplx (    -1.6720,     -3.2797 )
```

```
       vs( 67) = cmplx (     -1.6720,     -3.3762 )
       vs( 68) = cmplx (     -1.7363,     -3.4084 )
       vs( 69) = cmplx (     -1.7363,     -3.4405 )
       vs( 70) = cmplx (     -1.8006,     -3.5048 )
       vs( 71) = cmplx (     -1.8006,     -3.5370 )
       vs( 72) = cmplx (     -1.8650,     -3.6013 )
       vs( 73) = cmplx (     -1.8650,     -3.6334 )
       vs( 74) = cmplx (     -1.8650,     -3.6977 )
       vs( 75) = cmplx (     -1.8650,     -3.7299 )
       vs( 76) = cmplx (     -1.8650,     -3.8264 )
       vs( 77) = cmplx (     -1.8650,     -4.0193 )
c      sf(1) = cmplx(  -1.8649517,  -3.6012861)
       vs( 78) = cmplx (     -1.8650,     -4.1479 )
       vs( 79) = cmplx (     -1.8006,     -4.2122 )
       vs( 80) = cmplx (     -1.8006,     -4.3087 )
       vs( 81) = cmplx (     -1.8006,     -4.3730 )
       vs( 82) = cmplx (     -1.8006,     -4.5016 )
       vs( 83) = cmplx (     -1.7363,     -4.5981 )
       vs( 84) = cmplx (     -1.6077,     -4.8232 )
       vs( 85) = cmplx (     -1.4791,     -4.9518 )
       vs( 86) = cmplx (     -1.4148,     -5.1447 )
       vs( 87) = cmplx (     -1.4148,     -5.4341 )
       vs( 88) = cmplx (     -1.2862,     -5.6592 )
       vs( 89) = cmplx (     -1.2862,     -5.9486 )
       vs( 90) = cmplx (     -1.1576,     -6.1415 )
       vs( 91) = cmplx (     -1.0289,     -6.5273 )
       vs( 92) = cmplx (     -0.9003,     -6.7524 )
       vs( 93) = cmplx (     -0.8360,     -6.9775 )
       vs( 94) = cmplx (     -0.6431,     -7.3312 )
       vs( 95) = cmplx (     -0.6431,     -7.6527 )
       vs( 96) = cmplx (     -0.5788,     -8.0386 )
       vs( 97) = cmplx (     -0.4502,     -8.5531 )
       vs( 98) = cmplx (     -0.4502,     -8.9711 )
       vs( 99) = cmplx (     -0.4502,     -9.3891 )
       vs(100) = cmplx (     -0.4502,     -9.9035 )
       vs(101) = cmplx (     -0.5145,    -10.2251 )
       vs(102) = cmplx (     -0.5788,    -10.6431 )
       vs(103) = cmplx (     -0.6431,    -11.3826 )
       vs(104) = cmplx (     -0.7717,    -11.8971 )
       vs(105) = cmplx (     -0.9003,    -12.3794 )
       vs(106) = cmplx (     -1.0289,    -12.7974 )
       vs(107) = cmplx (     -1.0932,    -13.2154 )
       vs(108) = cmplx (     -1.2219,    -13.7299 )
       vs(109) = cmplx (     -1.3505,    -14.5016 )
       vs(110) = cmplx (     -1.4791,    -15.0482 )
       vs(111) = cmplx (     -1.8650,    -15.7878 )
       vs(112) = cmplx (     -2.1865,    -16.1736 )
       vs(113) = cmplx (     -2.6367,    -16.6238 )
       vs(114) = cmplx (     -3.0868,    -17.2990 )
       vs(115) = cmplx (     -3.6013,    -17.6527 )
       vs(116) = cmplx (     -3.9871,    -18.2315 )
       vs(117) = cmplx (     -4.6945,    -19.0997 )
       vs(118) = cmplx (     -5.0804,    -19.5177 )
       vs(119) = cmplx (     -5.8521,    -20.0000 )
       vs(120) = cmplx (     -6.4952,    -20.4823 )
       vs(121) = cmplx (     -6.9453,    -20.9646 )
       vs(122) = cmplx (     -7.3955,    -21.5113 )
       vs(123) = cmplx (     -8.5531,    -22.0579 )
       vs(124) = cmplx (     -9.2605,    -22.4759 )
       vs(125) = cmplx (     -9.9678,    -22.7974 )
       vs(126) = cmplx (    -10.7395,    -23.2797 )
       vs(127) = cmplx (    -11.3183,    -23.6013 )
       vs(128) = cmplx (    -12.2186,    -23.9871 )
```

```
         vs(129) = cmplx (  -12.9260,   -24.2765  )
         vs(130) = cmplx (  -13.8264,   -24.5016  )
         vs(131) = cmplx (  -14.6624,   -24.7588  )
         vs(132) = cmplx (  -15.3698,   -24.9196  )
         vs(133) = cmplx (  -16.0772,   -25.0804  )
         vs(134) = cmplx (  -16.9132,   -25.1768  )
         vs(135) = cmplx. (  -18.0707,  -25.2090  )
c        sf(5) = cmplx(  -19.099679,  -25.241158)
         vs(136) = cmplx (  -19.0997,   -25.2412  )
         vs(137) = cmplx (  -19.8714,   -25.2412  )
         vs(138) = cmplx (  -20.7074,   -25.1768  )
         vs(139) = cmplx (  -21.8650,   -25.1768  )
         vs(140) = cmplx (  -23.2797,   -25.0482  )
         vs(141) = cmplx (  -24.1801,   -24.9196  )
         vs(142) = cmplx (  -24.7588,   -24.7267  )
         vs(143) = cmplx (  -25.4019,   -24.5016  )
         vs(144) = cmplx (  -26.2379,   -24.2444  )
         vs(145) = cmplx (  -27.0740,   -23.9228  )
         vs(146) = cmplx (  -27.9743,   -23.5370  )
         vs(147) = cmplx (  -28.8746,   -23.2476  )
         vs(148) = cmplx (  -29.4534,   -22.7010  )
         vs(149) = cmplx (  -29.9035,   -22.3473  )
         vs(150) = cmplx (  -30.5466,   -21.9614  )
         vs(151) = cmplx (  -31.4469,   -21.5434  )
         vs(152) = cmplx (  -32.4116,   -20.7395  )
         vs(153) = cmplx (  -33.1190,   -20.1286  )
         vs(154) = cmplx (  -33.6978,   -19.5820  )
         vs(155) = cmplx (  -34.3408,   -19.1640  )
         vs(156) = cmplx (  -34.7910,   -18.6817  )
         vs(157) = cmplx (  -35.2412,   -17.8457  )
         vs(158) = cmplx (  -35.7556,   -17.2669  )
         vs(159) = cmplx (  -36.2701,   -16.4630  )
         vs(160) = cmplx (  -36.7846,   -15.9164  )
         vs(161) = cmplx (  -37.1704,   -15.4662  )
         vs(162) = cmplx (  -37.1704,   -14.6624  )
         vs(163) = cmplx (  -37.9421,   -14.1158  )
         vs(164) = cmplx (  -38.1994,   -13.6977  )
         vs(165) = cmplx (  -38.5209,   -13.1190  )
         vs(166) = cmplx (  -38.7781,   -12.2830  )
         vs(167) = cmplx (  -39.0354,   -11.7363  )
         vs(168) = cmplx (  -39.1640,   -11.1897  )
         vs(169) = cmplx (  -39.4212,   -10.6752  )
         vs(170) = cmplx (  -39.4212,   -10.1929  )
         vs(171) = cmplx (  -39.6785,    -9.7106  )
         vs(172) = cmplx (  -39.8071,    -9.1640  )
         vs(173) = cmplx (  -39.9357,    -8.5209  )
         vs(174) = cmplx (  -39.8714,    -8.0707  )
         vs(175) = cmplx (  -39.9357,    -7.7814  )
         vs(176) = cmplx (  -40.0000,    -7.4277  )
         vs(177) = cmplx (  -40.0000,    -7.1061  )
         vs(178) = cmplx (  -40.0000,    -6.6559  )
         vs(179) = cmplx (  -40.0000,    -6.2379  )
         vs(180) = cmplx (  -40.0000,    -5.9807  )
         vs(181) = cmplx (  -39.8714,    -5.7878  )
         vs(182) = cmplx (  -39.8714,    -5.5627  )
         vs(183) = cmplx (  -39.7428,    -5.2733  )
         vs(184) = cmplx (  -39.7428,    -5.1125  )
         vs(185) = cmplx (  -39.6785,    -4.8553  )
         vs(186) = cmplx (  -39.6785,    -4.5981  )
         vs(187) = cmplx (  -39.5498,    -4.4051  )
         vs(188) = cmplx (  -39.4212,    -4.3087  )
         vs(189) = cmplx (  -39.2926,    -4.1158  )
         vs(190) = cmplx (  -39.2926,    -3.9550  )
```

```
              vs(191) = cmplx (  -39.2283,      -3.7942 )
              vs(192) = cmplx (  -39.1640,      -3.6656 )
              vs(193) = cmplx (  -39.0354,      -3.5370 )
              vs(194) = cmplx (  -39.0354,      -3.4727 )
              vs(195) = cmplx (  -39.0354,      -3.4084 )
              vs(196) = cmplx (  -39.0354,      -3.3441 )
              vs(197) = cmplx (  -39.0354,      -3.3119 )
              vs(198) = cmplx (  -38.9711,      -3.2154 )
              vs(199) = cmplx (  -38.9711,      -3.1511 )
              vs(200) = cmplx (  -38.9068,      -3.0547 )
              vs(201) = cmplx (  -38.8424,      -3.0547 )
              vs(202) = cmplx (  -38.8424,      -2.9904 )
              vs(203) = cmplx (  -38.7781,      -2.9260 )
              vs(204) = cmplx (  -38.7781,      -2.8617 )
              vs(205) = cmplx (  -38.7781,      -2.8296 )
              vs(206) = cmplx (  -38.7781,      -2.7331 )
              vs(207) = cmplx (  -38.8424,      -2.7010 )
              vs(208) = cmplx (  -38.8424,      -2.6045 )
c
        nsfd1 = 73
        do i = 1, nsfd
           sfd(i) = vs(i+63)
        enddo
c
        return
        end
c
c
c
c****************************************************************
c
        subroutine ledge_taug (taug, ntaug, nssg, ledge, nledge)
c
c****************************************************************
c
c find taug() from ledge() with sampling rate nssg in unit of 1/fc
c
        real taug(1)
        integer ntaug, nssg, ledge(1), nledge
c
        ntaug = nledge
        do i = 1, ntaug
           taug(i) = float(ledge(i)-1)/float(nssg)
        enddo
c
        return
        end
c
c
c
c*****************************************************************
c
        subroutine sgg_def (sgg,nsgg1,nsgg2,ldsgg, nssg, taug, ntaug,
     &                      sfd, nsfd, nsfd1, nssfd)
c
c*****************************************************************
c
c generate a ghost reference matrix from sfd()
c   with edge located at taug()
c
c sgg()  - ghost reference matrix
c nsgg1  - row dim. of sgg() (or # of samples in each column)
c nsgg2  - column dim. of sgg() (or # of ghosts)
```

```
c ldsgg - leading dimension of sgg() storage
c nssg - sampling rate in unit of fc
c taug()-edge location of each corresponding sg()in sgg() in unit of 1/fc
c ntaug - # of ghosts
c
c sfd() - sf_detail()
c nsfd - n_sfd
c nsfd1 - edge location in sfd in unit of sample
c nssfd - n_sample_sfd in unit of fc
c
      complex sgg(ldsgg,1), sfd(1)
      real taug(1)
      integer nsgg1, nsgg2, ldsgg, nssg, ntaug, nsfd, nsfd1, nssfd
c
      nsgg2 = ntaug
      do ig2 = 1, nsgg2
        n_st = nsfd1 - nint (taug(ig2)*float(nssfd))
c
        do ig1 = 1, nsgg1
          j = n_st + (ig1-1) * nssfd / nssg
          if (j.lt.1) then
            sgg(ig1,ig2) = sfd(1)
          elseif (j.gt.nsfd) then
            sgg(ig1,ig2) = sfd (nsfd)
          else
            sgg(ig1,ig2) = sfd(j)
          endif
        enddo
      enddo
c
      return
      end
c
c
c
c****************************************************************
c
      subroutine sfddef1 (sfd, nsfd, nsfd1, nssfd, d2, d3)
c
c****************************************************************
c
c sfddef (s_ref_detail_defined): define reference vector
c
c sfd() - s reference vector
c nsfd - n_sfd
c nsdf1 - edge location in sfd()
c nssfd - sampling rate in unit of fc
c
c d2, d3 - range to be mapped onto for the real part in composite video
c          refer to note 0 page 68-75 for notation and derivation
c
      complex sfd(1)
      integer nsfd, nsfd1, nssfd
c
      real d2, d3
c
      complex vs(256)
      real d6, d7, d8, d9, g
c
      nsfd = 144
      nssfd = 64
``` c
```
      vs( 64) = cmplx (    -1.4791,     -3.1833 )
      vs( 65) = cmplx (    -1.5434,     -3.2476 )
      vs( 66) = cmplx (    -1.6720,     -3.2797 )
      vs( 67) = cmplx (    -1.6720,     -3.3762 )
      vs( 68) = cmplx (    -1.7363,     -3.4084 )
      vs( 69) = cmplx (    -1.7363,     -3.4405 )
      vs( 70) = cmplx (    -1.8006,     -3.5048 )
      vs( 71) = cmplx (    -1.8006,     -3.5370 )
      vs( 72) = cmplx (    -1.8650,     -3.6013 )
      vs( 73) = cmplx (    -1.8650,     -3.6334 )
      vs( 74) = cmplx (    -1.8650,     -3.6977 )
      vs( 75) = cmplx (    -1.8650,     -3.7299 )
      vs( 76) = cmplx (    -1.8650,     -3.8264 )
      vs( 77) = cmplx (    -1.8650,     -4.0193 )
c     sf(1) = cmplx( -1.8649517, -3.6012861)
      vs( 78) = cmplx (    -1.8650,     -4.1479 )
      vs( 79) = cmplx (    -1.8006,     -4.2122 )
      vs( 80) = cmplx (    -1.8006,     -4.3087 )
      vs( 81) = cmplx (    -1.8006,     -4.3730 )
      vs( 82) = cmplx (    -1.8006,     -4.5016 )
      vs( 83) = cmplx (    -1.7363,     -4.5981 )
      vs( 84) = cmplx (    -1.6077,     -4.8232 )
      vs( 85) = cmplx (    -1.4791,     -4.9518 )
      vs( 86) = cmplx (    -1.4148,     -5.1447 )
      vs( 87) = cmplx (    -1.4148,     -5.4341 )
      vs( 88) = cmplx (    -1.2862,     -5.6592 )
      vs( 89) = cmplx (    -1.2862,     -5.9486 )
      vs( 90) = cmplx (    -1.1576,     -6.1415 )
      vs( 91) = cmplx (    -1.0289,     -6.5273 )
      vs( 92) = cmplx (    -0.9003,     -6.7524 )
      vs( 93) = cmplx (    -0.8360,     -6.9775 )
      vs( 94) = cmplx (    -0.6431,     -7.3312 )
      vs( 95) = cmplx (    -0.6431,     -7.6527 )
      vs( 96) = cmplx (    -0.5788,     -8.0386 )
      vs( 97) = cmplx (    -0.4502,     -8.5531 )
      vs( 98) = cmplx (    -0.4502,     -8.9711 )
      vs( 99) = cmplx (    -0.4502,     -9.3891 )
      vs(100) = cmplx (    -0.4502,     -9.9035 )
      vs(101) = cmplx (    -0.5145,    -10.2251 )
      vs(102) = cmplx (    -0.5788,    -10.6431 )
      vs(103) = cmplx (    -0.6431,    -11.3826 )
      vs(104) = cmplx (    -0.7717,    -11.8971 )
      vs(105) = cmplx (    -0.9003,    -12.3794 )
      vs(106) = cmplx (    -1.0289,    -12.7974 )
      vs(107) = cmplx (    -1.0932,    -13.2154 )
      vs(108) = cmplx (    -1.2219,    -13.7299 )
      vs(109) = cmplx (    -1.3505,    -14.5016 )
      vs(110) = cmplx (    -1.4791,    -15.0482 )
      vs(111) = cmplx (    -1.8650,    -15.7878 )
      vs(112) = cmplx (    -2.1865,    -16.1736 )
      vs(113) = cmplx (    -2.6367,    -16.6238 )
      vs(114) = cmplx (    -3.0868,    -17.2990 )
      vs(115) = cmplx (    -3.6013,    -17.6527 )
      vs(116) = cmplx (    -3.9871,    -18.2315 )
      vs(117) = cmplx (    -4.6945,    -19.0997 )
      vs(118) = cmplx (    -5.0804,    -19.5177 )
      vs(119) = cmplx (    -5.8521,    -20.0000 )
      vs(120) = cmplx (    -6.4952,    -20.4823 )
      vs(121) = cmplx (    -6.9453,    -20.9646 )
      vs(122) = cmplx (    -7.3955,    -21.5113 )
      vs(123) = cmplx (    -8.5531,    -22.0579 )
      vs(124) = cmplx (    -9.2605,    -22.4759 )
      vs(125) = cmplx (    -9.9678,    -22.7974 )
      vs(126) = cmplx (   -10.7395,    -23.2797 )
```

```
       vs(127) = cmplx (   -11.3183,    -23.6013 )
       vs(128) = cmplx (   -12.2186,    -23.9871 )
       vs(129) = cmplx (   -12.9260,    -24.2765 )
       vs(130) = cmplx (   -13.8264,    -24.5016 )
       vs(131) = cmplx (   -14.6624,    -24.7588 )
       vs(132) = cmplx (   -15.3698,    -24.9196 )
       vs(133) = cmplx (   -16.0772,    -25.0804 )
       vs(134) = cmplx (   -16.9132,    -25.1768 )
       vs(135) = cmplx (   -18.0707,    -25.2090 )
c      sf(5)   = cmplx(  -19.099679,  -25.241158)
       vs(136) = cmplx (   -19.0997,    -25.2412 )
       vs(137) = cmplx (   -19.8714,    -25.2412 )
       vs(138) = cmplx (   -20.7074,    -25.1768 )
       vs(139) = cmplx (   -21.8650,    -25.1768 )
       vs(140) = cmplx (   -23.2797,    -25.0482 )
       vs(141) = cmplx (   -24.1801,    -24.9196 )
       vs(142) = cmplx (   -24.7588,    -24.7267 )
       vs(143) = cmplx (   -25.4019,    -24.5016 )
       vs(144) = cmplx (   -26.2379,    -24.2444 )
       vs(145) = cmplx (   -27.0740,    -23.9228 )
       vs(146) = cmplx (   -27.9743,    -23.5370 )
       vs(147) = cmplx (   -28.8746,    -23.2476 )
       vs(148) = cmplx (   -29.4534,    -22.7010 )
       vs(149) = cmplx (   -29.9035,    -22.3473 )
       vs(150) = cmplx (   -30.5466,    -21.9614 )
       vs(151) = cmplx (   -31.4469,    -21.5434 )
       vs(152) = cmplx (   -32.4116,    -20.7395 )
       vs(153) = cmplx (   -33.1190,    -20.1286 )
       vs(154) = cmplx (   -33.6978,    -19.5820 )
       vs(155) = cmplx (   -34.3408,    -19.1640 )
       vs(156) = cmplx (   -34.7910,    -18.6817 )
       vs(157) = cmplx (   -35.2412,    -17.8457 )
       vs(158) = cmplx (   -35.7556,    -17.2669 )
       vs(159) = cmplx (   -36.2701,    -16.4630 )
       vs(160) = cmplx (   -36.7846,    -15.9164 )
       vs(161) = cmplx (   -37.1704,    -15.4662 )
       vs(162) = cmplx (   -37.1704,    -14.6624 )
       vs(163) = cmplx (   -37.9421,    -14.1158 )
       vs(164) = cmplx (   -38.1994,    -13.6977 )
       vs(165) = cmplx (   -38.5209,    -13.1190 )
       vs(166) = cmplx (   -38.7781,    -12.2830 )
       vs(167) = cmplx (   -39.0354,    -11.7363 )
       vs(168) = cmplx (   -39.1640,    -11.1897 )
       vs(169) = cmplx (   -39.4212,    -10.6752 )
       vs(170) = cmplx (   -39.4212,    -10.1929 )
       vs(171) = cmplx (   -39.6785,     -9.7106 )
       vs(172) = cmplx (   -39.8071,     -9.1640 )
       vs(173) = cmplx (   -39.9357,     -8.5209 )
       vs(174) = cmplx (   -39.8714,     -8.0707 )
       vs(175) = cmplx (   -39.9357,     -7.7814 )
       vs(176) = cmplx (   -40.0000,     -7.4277 )
       vs(177) = cmplx (   -40.0000,     -7.1061 )
       vs(178) = cmplx (   -40.0000,     -6.6559 )
       vs(179) = cmplx (   -40.0000,     -6.2379 )
       vs(180) = cmplx (   -40.0000,     -5.9807 )
       vs(181) = cmplx (   -39.8714,     -5.7878 )
       vs(182) = cmplx (   -39.8714,     -5.5627 )
       vs(183) = cmplx (   -39.7428,     -5.2733 )
       vs(184) = cmplx (   -39.7428,     -5.1125 )
       vs(185) = cmplx (   -39.6785,     -4.8553 )
       vs(186) = cmplx (   -39.6785,     -4.5981 )
       vs(187) = cmplx (   -39.5498,     -4.4051 )
       vs(188) = cmplx (   -39.4212,     -4.3087 )
```

```fortran
      vs(189) = cmplx (    -39.2926,       -4.1158 )
      vs(190) = cmplx (    -39.2926,       -3.9550 )
      vs(191) = cmplx (    -39.2283,       -3.7942 )
      vs(192) = cmplx (    -39.1640,       -3.6656 )
      vs(193) = cmplx (    -39.0354,       -3.5370 )
      vs(194) = cmplx (    -39.0354,       -3.4727 )
      vs(195) = cmplx (    -39.0354,       -3.4084 )
      vs(196) = cmplx (    -39.0354,       -3.3441 )
      vs(197) = cmplx (    -39.0354,       -3.3119 )
      vs(198) = cmplx (    -38.9711,       -3.2154 )
      vs(199) = cmplx (    -38.9711,       -3.1511 )
      vs(200) = cmplx (    -38.9068,       -3.0547 )
      vs(201) = cmplx (    -38.8424,       -3.0547 )
      vs(202) = cmplx (    -38.8424,       -2.9904 )
      vs(203) = cmplx (    -38.7781,       -2.9260 )
      vs(204) = cmplx (    -38.7781,       -2.8617 )
      vs(205) = cmplx (    -38.7781,       -2.8296 )
      vs(206) = cmplx (    -38.7781,       -2.7331 )
      vs(207) = cmplx (    -38.8424,       -2.7010 )
      vs(208) = cmplx (    -38.8424,       -2.6045 )
c
      nsfd1 = 73
      do i = 1, nsfd
        sfd(i) = vs(i+63)
      enddo
c
      d6 = (40.*d3+100.*d2)/140.
      d7 = real(sfd(1))
      d8 = d7
c
      do i = 2, nsfd
        if (real(sfd(i)).gt.d7) d7 = real(sfd(i))
        if (real(sfd(i)).lt.d8) d8 = real(sfd(i))
      enddo
c
      g = (d6-d2)/(d7-d8)
      do i = 1, nsfd
        sfd(i) = g*(sfd(i)-d8*cmplx(1.,1.)) + d2*cmplx(1.,1.)
      enddo
c
      return
      end
c
c
c
c******************************************************************
c
      subroutine copy1_r (x,y,nx)
c
c******************************************************************
c
c copy 1-dim real vector x() to y()
c
      real x(1), y(1)
      integer nx
c
      do i = 1,nx
        y(i) = x(i)
      enddo
c
      return
      end
c
```

```fortran
c
c
c ****************************************************************
c
      subroutine lpd (b,nb, err, tau, ts, ro_x, fb)
c
c ****************************************************************
c
c linear predition coefficients and error calculation
c
c                   1
c s_lpd(n*ts-tau) = S b(i) * s(n*ts-i+1)
c                  i=1
c
c cf: DSRC note R2 for derivation and notations
c
c ----- on entry -----
c tau - time delay from current sample
c ts - sampling interval
c nb - n_b (no. of coefficients), nb =< 10
c ro_x - external autocorrelation function
c fb - band width
c
c ---- on return -----
c b() - linear predicaiton coefficients
c err - prediction error
c
c ---- tp -----
c cov_x_tp() - storage for covariance matrix
c ro_x_tp() - correlation vector
c c_tp - complex no.
c l - nb
      complex b(1), ro_x
      real tau, ts, fb, err
      integer nb
c
      complex cov_x_tp(100), ro_x_tp(10), c_tp
      integer l, l_tp(10), m_tp(10)
c
      external ro_x
c
      l = nb
      do i = 1,l
        do j = 1,l
          cov_x_tp(i+(j-1)*l) = ro_x(float(i-j)*ts,fb)
        enddo
        ro_x_tp(i) = ro_x(float(i-1)*ts-tau,fb)
      enddo
c
      call minvc (cov_x_tp, l, c_tp, l_tp, m_tp)
      if ((cabs(c_tp)+1.).eq.1.) print *,'ill conditioned matrix'
c
      do i = 1,l
        b(i) = 0.
        do j = 1,l
          b(i) = b(i) + cov_x_tp(i+(j-1)*l) * ro_x_tp(j)
        enddo
      enddo
c
      c_tp = 1.
      do i = 1,l
        c_tp = c_tp - conjg(ro_x_tp(i)) * b(i)
      enddo
      err = cabs(c_tp)
```

```
c      return
       end
c
c
c
c ***************************************************************
c
       complex function ro_cos (tau, fb)
c
c ***************************************************************
c
c autocorrelation function fo a unit power signal with
c   rasied cosine power spectrum density function   in (0,fb)
c cf: page 123 of DSRC note 0
c
c ro_cos - output function value
c tau - time
c fb - frquency
c
       real tau, fb
c
       real pi, fi
       complex ro_tp
c
       ratio = 3.
       pi = acos(-1.)
c df = fh (horizontal scan frequency in unit of fc)
       df = 4./910.
       nf = nint(fb/df)
c
       ro_tp = 0.
       do i = 0, nf
         fi = float(i) * df
         ro_tp = ro_tp + (1. + (ratio-1.) * (1.-cos(pi*fi)) / 2. )
       enddo
c
       ro_cos = 0.
       do i = 0, nf
         fi = float(i) * df
         ro_cos = ro_cos + (1. + (ratio-1.) * (1.-cos(pi*fi)) / 2. )
     &           * cexp(cmplx(0.,2.*pi*fi*tau))
       enddo
       ro_cos = ro_cos / ro_tp
c
       return
       end
c
c
c
c ***************************************************************
c
       complex function ro_cos_rat (tau, fb, ratio)
c
c ***************************************************************
c
c autocorrelation function fo a unit power signal with
c   rasied cosine power spectrum density function   in (0,fb)
c cf: page 123 of DSRC note 0
c
c ro_cos_rat - output function value
c tau - time
c fb - frquency
```

```
c ratio - peak to valley ratio in the power spectrum assumed
      real tau, fb, ratio
c
      real pi, fi
      complex ro_tp
c
      pi = acos(-1.)
c df = fh (horizontal scan frequency in unit of fc)
      df = 4./910.
      nf = nint(fb/df)
c
      ro_tp = 0.
      do i = 0, nf
        fi = float(i) * df
        ro_tp = ro_tp + 1. + (ratio-1.) * (1.-cos(pi*fi)) / 2.
      enddo
c
      ro_cos_rat = 0.
      do i = 0, nf
        fi = float(i) * df
        ro_cos_rat = ro_cos_rat + (1. + (ratio-1.)*(1.-cos(pi*fi)) /2. )
     &                 * cexp( cmplx(0.,2.*pi*fi*tau) )
      enddo
      ro_cos_rat = ro_cos_rat / ro_tp
c
      return
      end
c
c
c
c *****************************************************************
c
      complex function ro_flat (tau, fb)
c
c *****************************************************************
c
c autocorrelation function fo a unit power signal with
c  flat power spectrum density function  in (0,fb)
c
c ro_flat - output function value
c tau - time
c fb - frquency
c
      real tau, fb
c
      real fa
c
      fa = acos(-1.)*tau*fb
c
      if (abs(fa).lt.10.e-6) then
        ro_flat = 1.
      else
        ro_flat = cexp(cmplx(0.,fa))*sin(fa)/fa
      endif
c
      return
      end
c
c
c
c *****************************************************************
c
      subroutine lpd_rat (b,nb, err, tau, ts, ro_cos_rat, fb, ratio)
```

```
c
c ***************************************************************
c
c linear predition coefficients and error calculation
c
c                    1
c s_lpd(n*ts-tau) = S b(i) * s(n*ts-i+1)
c                   i=1
c
c cf: DSRC note R2 for derivation and notations
c
c ----- on entry -----
c tau - time delay from current sample
c ts  - sampling interval
c nb  - n_b (no. of coefficients), nb =< 10
c ro_x - external autocorrelation function
c fb  - band width
c
c ---- on return -----
c b() - linear predicaiton coefficients
c err - prediction error
c
c ---- tp -----
c cov_x_tp() - storage for covariance matrix
c ro_x_tp() - correlation vector
c c_tp - complex no.
c l - nb
      complex b(1), ro_cos_rat
      real tau, ts, fb, rat, err
      integer nb
c
      complex cov_x_tp(100), ro_x_tp(10), c_tp
      integer l, l_tp(10), m_tp(10)
c
      external ro_cos_rat
c
      l = nb
      do i = 1,l
        do j = 1,l
          cov_x_tp(i+(j-1)*l) = ro_cos_rat(float(i-j)*ts,fb,ratio)
        enddo
        ro_x_tp(i) = ro_cos_rat(float(i-1)*ts-tau,fb,ratio)
      enddo
c
      call minvc (cov_x_tp, l, c_tp, l_tp, m_tp)
      if ((cabs(c_tp)+1.).eq.1.) print *,'ill conditioned matrix'
c
      do i = 1,l
        b(i) = 0.
        do j = 1,l
          b(i) = b(i) + cov_x_tp(i+(j-1)*l) * ro_x_tp(j)
        enddo
      enddo
c
      c_tp = 1.
      do i = 1,l
        c_tp = c_tp - conjg(ro_x_tp(i)) * b(i)
      enddo
      err = cabs(c_tp)
c
      return
      end
```

```
c
c
c
c ****************************************************************
c
      subroutine hilbert (hh, nhh)
c
c ****************************************************************
c
c calculate truncated impulse response of the digital Hilbert transform
c
c hh() - impulse reponse
c nhh - positivee time no. of coefficients
c
      real hh(1)
c
      real pi
c
      pi = acos (-1.)
c
      do i = 1,nhh
         hh(i) = 0.
      enddo
c
      do i = 1, nhh, 2
         hh(i) = 2. * (sin(pi*float(i)/2.)**2) / (pi * float(i))
      enddo
c
      return
      end
```

```
C        SUB-ROUTINE MINVc
C
C        PURPOSE
C           INVERT A complex MATRIX
C
C        USAGE
C           CALL MINVc(A,N,D,L,M)
C
C        DESCRIPTION OF PARAMETERS
C           A - INPUT MATRIX, DESTROYED IN COMPUTATION AND REPLACED BY
C               RESULTANT INVERSE.
C           N - ORDER OF MATRIX A
C           D - RESULTANT DETERMINANT
C           L - WORK VECTOR OF LENGTH N
C           M - WORK VECTOR OF LENGTH N
C
C        REMARKS
C           MATRIX A MUST BE A GENERAL MATRIX
C
C        SUB-ROUTINES AND FUNCTION SUBPROGRAMS REQUIRED
C           NONE
C
C        METHOD
C           THE STANDARD GAUSS-JORDAN METHOD IS USED. THE DETERMINANT
C           IS ALSO CALCULATED. A DETERMINANT OF ZERO INDICATES THAT
C           THE MATRIX IS SINGULAR.
C
C     ................................................................
C
      SUBROUTINE MINVc(A,N,D,L,M)
      DIMENSION A(1),L(1),M(1)
C
C     ................................................................
```

IF A DOUBLE PRECISION VERSION OF THIS ROUTINE IS DESIRED, THE
C IN COLUMN 1 SHOULD BE REMOVED FROM THE DOUBLE PRECISION
STATEMENT WHICH FOLLOWS.

```
complex A,D,BIGA,HOLD
```

THE C MUST ALSO BE REMOVED FROM DOUBLE PRECISION STATEMENTS
APPEARING IN OTHER ROUTINES USED IN CONJUNCTION WITH THIS
ROUTINE.

THE DOUBLE PRECISION VERSION OF THIS SUB-ROUTINE MUST ALSO
CONTAIN DOUBLE PRECISION FORTRAN FUNCTIONS. ABS IN STATEMENT
10 MUST BE CHANGED TO DABS.

..............................................................

SEARCH FOR LARGEST ELEMENT

```
D=1.0
NK=-N
DO 80 K=1,N
NK=NK+N
L(K)=K
M(K)=K
KK=NK+K
BIGA=A(KK)
DO 20 J=K,N
IZ=N*(J-1)
DO 20 I=K,N
IJ=IZ+I
IF( cABS(BIGA)- cABS(A(IJ))) 15,20,20
BIGA=A(IJ)
L(K)=I
M(K)=J
CONTINUE
```

INTERCHANGE ROWS

```
J=L(K)
IF(J-K) 35,35,25
KI=K-N
DO 30 I=1,N
KI=KI+N
HOLD=-A(KI)
JI=KI-K+J
A(KI)=A(JI)
A(JI) =HOLD
```

INTERCHANGE COLUMNS

```
I=M(K)
IF(I-K) 45,45,38
JP=N*(I-1)
DO 40 J=1,N
JK=NK+J
JI=JP+J
HOLD=-A(JK)
A(JK)=A(JI)
A(JI) =HOLD
```

DIVIDE COLUMN BY MINUS PIVOT (VALUE OF PIVOT ELEMENT IS
   CONTAINED IN BIGA)

```
C
   45 if (biga.ne.cmplx(0.,0.)) goto 48
   46 D=0.0
      RETURN
   48 DO 55 I=1,N
      IF(I-K) 50,55,50
   50 IK=NK+I
      A(IK)=A(IK)/(-BIGA)
   55 CONTINUE
C
C        REDUCE MATRIX
C
      DO 65 I=1,N
      IK=NK+I
      HOLD=A(IK)
      IJ=I-N
      DO 65 J=1,N
      IJ=IJ+N
      IF(I-K) 60,65,60
   60 IF(J-K) 62,65,62
   62 KJ=IJ-I+K
      A(IJ)=HOLD*A(KJ)+A(IJ)
   65 CONTINUE
C
C        DIVIDE ROW BY PIVOT
C.
      KJ=K-N
      DO 75 J=1,N
      KJ=KJ+N
      IF(J-K) 70,75,70
   70 A(KJ)=A(KJ)/BIGA
   75 CONTINUE
C
C        PRODUCT OF PIVOTS
C
      D=D*BIGA
C
C        REPLACE PIVOT BY RECIPROCAL
C
      A(KK)=1.0/BIGA
   80 CONTINUE
C
C        FINAL ROW AND COLUMN INTERCHANGE
C
      K=N
  100 K=(K-1)
      IF(K) 150,150,105
  105 I=L(K)
      IF(I-K) 120,120,108
  108 JQ=N*(K-1)
      JR=N*(I-1)
      DO 110 J=1,N
      JK=JQ+J
      HOLD=A(JK)
      JI=JR+J
      A(JK)=-A(JI)
  110 A(JI) =HOLD
  120 J=M(K)
      IF(J-K) 100,100,125
  125 KI=K-N
      DO 130 I=1,N
      KI=KI+N
      HOLD=A(KI)
```

```
      JI=KI-K+J
      A(KI)=-A(JI)
  130 A(JI) =HOLD
      GO TO 100
  150 RETURN
      END
c
c
c ********************************************************
c
      subroutine miv1 (m, n, mi, d)
c
c ********************************************************
c
c complex matrix inversion (cf: minvc sub-routine)
c
c m(1): n x n input complex matrix
c n: dimension parameter
c mi(1): n x n output inverted matrix
c d: determinant of m
c
c lwv(100): working temp. vector
c mwv(100): working temp. vector
c
      complex m(1), mi(1), d
      integer n
c
      integer lwv(100), mwv(100)
c
      do 100 i=1,n*n
  100 mi(i)=m(i)
c
      call minvc(mi,n,d,lwv,mwv)
c
      return
      end
c
c
c
```

What is claimed is:

1. A system for eliminating ghost signals from a TV signal, comprising:

first means for providing first and second sampled data signals occurring at a predetermined frequency, said first and second sampled data signals representing in-phase and quadrature phase components of said TV signal, said TV signal including a training signal component and subject to including multipath ghost components;

second means for providing first and second reference signals respectively representing in-phase and quadrature phase components of said training signal component free of any ghost components;

control means coupled to said first and second means and responsive to said first and second reference signals and said first and second sampled data signals, for detecting the occurrence of said multipaths ghost components with temporal resolution less than the period of said sampled data signals and generating delay control signals representing temporal relationships between said training signal and said multipath of ghost component signals, and for generating coefficient control signals related to intensity values of said multipath ghost component signals; and filter means including:

signal combining means having a first input port coupled to said first means, having a second input port and an output port;

a cascade connection of signal scaling means and signal delaying means coupled between said second input port and said output port of said signal combining means, said signal scaling means having a control input port for receiving coefficient control signals and responsive thereto for scaling signals, said signal delay means including means for effectively delaying samples by non-integer periods of said samples and responsive to said delay control signals for programmably delaying samples.

2. A system for correcting multipath distortion, comprising:

a source of input signal including a direct signal having a training signal component, and further including delayed signals which constitute undesirable multipath distortion components;

a source of reference signal representing said training signal substantially free of any multipath distortion;

infinite impulse response filtering means having programmable tap delays, an output port, an input port coupled to said source of input signals and having programmable filter coefficient values;

control means coupled to said source of input signal and to said source of reference signal for developing a mathematical model of a signal filtering system which, responsive to said reference signal produces a signal substantially representing said input signal, and for programming the coefficient values of said infinite impulse response filtering means with coefficient values determined from said mathematical model and including means for programming the tap delays of said infinite impulse response filtering means with delay values determined from said mathematical model to condition said infinite impulse response filtering means to provide, as an output signal at said output port, said direct signal to the substantial exclusion of said delayed signals.

3. The system set forth in claim 2 further comprising:

a source of sampling clock signal for providing clock pulses at a predetermined frequency;

analog-to-digital conversion means, coupled to said source of input signal for developing digital samples representing said input signal at instants determined by said sampling clock signal, said analog-to-digital conversion means being coupled to provide said digital samples to said infinite pulse response filtering means and to said control means; and wherein said source of reference signal includes read-only memory means programmed with sample values representing said reference signal; and said control means includes:
read-write memory means; and
data processing means coupled to said read-only memory means and to said read-write memory means, and being controlled by a program to store a plurality of said digital samples representing the training signal component of said input signal into said read-write memory means, to generate said mathematical model of said signal filtering system and to generate said coefficient values and said tap delay values for said infinite impulse response filtering means.

4. The system set forth in claim 3 wherein:

said infinite impulse response filtering means includes:
an input port for applying the digital samples representing said input signal;
first signal combining means, coupled to said input port for combining the digital samples representing said input signal with digital samples representing a correction signal to produce said output signal;
programmable signal delaying means, coupled to said first combining means, for delaying the signal provided thereby, having a plurality of output ports and having circuitry for providing delayed versions of the signal provided by said combining means at each of said output ports, wherein the amount of time delay imparted to the signal provided at each of said output ports is determined by first programming control signals;
a plurality of programmable coefficient multiplying means, each coupled to a respectively different one of the output ports of said programmable signal delaying means for multiplying the signals provided thereby by respectively different ones of said coefficient values, each of said coefficient values being determined by second programming control signals applied to each of said plurality of programmable coefficient multiplying means; and second signal combining means coupled to each of said plurality of programmable coefficient multiplying means for combining the respective signals provided thereby to generate said correction signal; and said data processing means is controlled by said program to generate said first programming control signals and said second programming control signals.

5. The system set forth in claim 4 wherein said programmable signal delaying means includes:

sampled data signal delaying means, coupled to said source of sampling clock signal, having an input port coupled to receive the output signal of said first combining means and responsive to said second programming control signals for providing a plurality of selected delayed versions of the output signal of said first combining means at respective output ports, each of said selected delayed versions of said output signal of said first combining means being delayed with respect to the output signal of said first combining means by respectively different integer multiples of the period of said sampling clock signal; and signal interpolation means, coupled to at least one of the output ports of said sampled data signal delaying means and responsive to said second control signals for effectively delaying the signal provided at the one output port of said sampled data signal delaying means by an amount of time substantially equal to N/M times the period of said sampling clock signal where M is an integer greater than 1 and N is a positive integer having a value determined by said second control signals 6. A system for correcting multipath distortion in a video signal, comprising:

a source of video signal including a direct signal having a training signal component, said direct signal modulating a carrier signal, and further including delayed signals which constitute undesirable multipath distortion components;

demodulation means, coupled to said source of video signal, for demodulating said video signal into first and second signal components representing baseband signals that are respectively in-phase with and quadrature phase related to said carrier signal;

complex infinite impulse response filtering means having first and second input ports coupled to receive said first and second signals, respectively, and having programmable complex filter coefficient values and programmable tap delays;

a source of first and second reference signals representing, respectively, the training signal components of said first and second signals to the substantial exclusion of any multipath distortion components;

control means coupled to said demodulation means and to said source of first and second reference signals for developing a mathematical model of a signal filtering system which, responsive to said first and second reference signals produces first and second synthesized signals that substantially represent the training signal components of said first and second signals, respectively, and for programming the complex coefficient values of said infinite impulse response filtering means with complex coefficient values and said programmable tap delays with delay values determined from said mathematical model, to condition said infinite impulse response filtering means to provide, as an output signal at said output port, the first signal component of said direct signal to the substantial exclusion of said delayed signals.

7. The system set forth in claim 6, further comprising:
a source of sampling clock signal for providing clock pulses at a predetermined frequency;
first and second analog-to-digital conversion means, coupled to said demodulation means for developing, respectively, first and second sequences of digital samples representing said first and second signals at instants determined by said sampling clock signal, said first and second analog-to-digital conversion means being coupled to provide said first and second sequences of digital samples to said infinite impulse response filtering means and to said control means; and wherein
said source of said first and second reference signals includes read-only memory means programmed with sample values representing said first and second reference signals; and
said control means includes:
read-write memory means; and
data processing means coupled to said read-only memory means and to said read-write memory means and being controlled by a program to store a plurality of digital samples from each of said first and second sequences of digital samples, representing the training signal component of said video signal, into said read-write memory means, to generate said mathematical model of said signal filtering system and to generate said complex coefficient values and said tap delay values for said infinite impulse response filtering means.

8. The system set forth in claim 7 wherein:
said infinite impulse response filtering means includes:
first and second input ports for applying said first and second sequences of digital samples;
first and second signal combining means, coupled respectively to said first and second input ports for combining said first and second sequences of digital samples with respective first and second further sequences of digital samples representing respective first and second correction signals to produce first and second sequences of corrected samples, respectively, wherein said first sequence of corrected samples is the output signal of said infinite impulse response filtering means;
programmable signal delaying means, coupled to said first and second combining means for delaying the respective first and second sequences of corrected samples provided thereby, having a plurality of output ports and having circuitry for providing delayed versions of said first and second sequences of corrected samples at each of said output ports, wherein the amount of time delay imparted to the delayed versions of said first and second sequences of corrected samples provided at each of said output ports is determined by first programming control signals;
a plurality of programmable complex coefficient multiplying means each coupled to a respectively different one of the output ports of said programmable signal delaying means for multiplying the delayed versions of the first and second sequences of corrected samples provided thereby by respectively different ones of said complex coefficient values to develop first and second sequences of scaled sample values, each of said complex coefficient values being determined by second programming control signals applied to each of said plurality of programmable complex coefficient multiplying means; and
third and fourth sample combining means, coupled to each of said complex coefficient multiplying means for combining the respective first and second sequences of scaled sample values provided thereby to generate said first and second sequences of corrected samples, respectively; and
said data processing means controlled by said program to generate said first programming control signals and said second programming control signals.

9. The system set forth in claim 8 wherein said programmable signal delaying means includes:
sampled data signal delaying means, coupled to said source of sampling clock signal, having first and second input ports coupled to receive the first and second sequences of corrected samples, respectively, and responsive to said second programming control signals for providing a plurality of selected delayed versions of said first and second sequences of corrected samples at respective output ports, each of said selected delayed versions of said first and second sequences of corrected samples being delayed with respect to said first and second sequences of corrected samples by respectively different integer multiples of the period of said sampling clock signal; and
sample value interpolation means, coupled to at least one of the output ports of said sampled data signal delaying means and responsive to said second control signals for effectively delaying the selected delayed version of said first and second sequences of corrected samples provided thereby by an amount of time substantially equal to N/M times the period of said sampling clock signal where M is an integer greater than 1 and N is a positive integer having a value determined by said second control signals.

10. A system for correcting distortion in a sampled data signal comprising:
a source of sampled data input signal including a training signal component, said input signal subject to being distorted, and samples of said input signal occurring at a predetermined regular rate;
a source of reference signal representing said training signal substantially free of said distortion;
filter means including signal combining means having a first input port coupled to said source of sampled data input signal, a second input port and an output port, means coupled between said output port and said second input port of said combining means, and having control input ports, for providing scaled and delayed samples responsive to coefficient and delay control signals applied to said control input ports, said means for providing scaled and delayed samples including means to effectively delay samples by non-integer sample periods;

control means coupled to said source of sampled data input signal and said source of reference signal for generating said coefficient and delay control signals, including means for generating coefficient and delay values to synthesize a signal substantially representing said training signal component and generating said coefficient and delay control signals from said coefficient and delay values.

* * * * *